US006762941B2

(12) United States Patent
Roth

(10) Patent No.: US 6,762,941 B2
(45) Date of Patent: Jul. 13, 2004

(54) TECHNIQUES FOR CONNECTING A SET OF CONNECTING ELEMENTS USING AN IMPROVED LATCHING APPARATUS

(75) Inventor: Richard F. Roth, Brookline, NH (US)

(73) Assignee: Teradyne, Inc., Boston, MA (US)

(*) Notice: Subject to any disclaimer, the term of this patent is extended or adjusted under 35 U.S.C. 154(b) by 17 days.

(21) Appl. No.: 10/195,288

(22) Filed: Jul. 15, 2002

(65) Prior Publication Data

US 2004/0008494 A1 Jan. 15, 2004

(51) Int. Cl.⁷ .............................................. H05K 1/14
(52) U.S. Cl. ...................... 361/736; 361/752; 361/753; 361/796; 361/754; 361/756; 361/759; 361/825; 361/683
(58) Field of Search ............................. 361/752, 753, 361/754, 756, 759, 683, 796, 825, 728, 736

(56) References Cited

U.S. PATENT DOCUMENTS

| | | | |
|---|---|---|---|
| 3,209,301 A | 9/1965 | Duffy, Jr. ..................... | 339/22 |
| 4,088,386 A | 5/1978 | Hawk ...................... | 350/96.21 |
| 4,158,476 A | 6/1979 | McCartney .............. | 350/96.21 |
| 4,258,977 A | 3/1981 | Lukas et al. ............. | 350/96.21 |
| 4,277,135 A | 7/1981 | Schrott et al. ........... | 350/96.21 |
| 4,436,366 A | 3/1984 | Abramson ................. | 350/96.2 |
| 4,456,351 A | 6/1984 | Hiramatsu et al. .......... | 354/402 |
| 4,469,398 A | 9/1984 | De Baets et al. .......... | 350/96.2 |
| 4,613,105 A | 9/1986 | Genequand et al. ........ | 248/178 |
| 4,712,848 A | * 12/1987 | Edgley ........................ | 439/327 |
| 4,787,706 A | 11/1988 | Cannon et al. ............. | 350/96.2 |
| 4,904,036 A | 2/1990 | Blonder .................... | 350/96.11 |
| 5,073,000 A | 12/1991 | Derfiny ........................ | 385/14 |
| 5,082,344 A | 1/1992 | Mulholland et al. .......... | 385/60 |
| 5,121,454 A | 6/1992 | Iwano et al. .................. | 385/60 |
| 5,123,073 A | 6/1992 | Pimpinella .................... | 385/59 |

(List continued on next page.)

FOREIGN PATENT DOCUMENTS

| | | | |
|---|---|---|---|
| EP | 0 813 083 A1 | 12/1997 | ............ G02B/6/43 |
| EP | 1 048 963 A1 | 11/2000 | ............ G02B/6/38 |
| JP | 63-285961 | 11/1988 | |
| JP | 10-74884 | 3/1989 | |
| WO | WO 99/13367 | 3/1999 | ............ G02B/6/26 |

OTHER PUBLICATIONS

3M Utilities and Telecommunications: VOL–0570 VF–45™ Maintenance Cleaning Kit; http://products.3m.com/us/util_telecom/products/tsdvolition.jhtml!powurl+GSN8925771gs; Visited Site on Apr. 24, 2002; 2 Pages.

(List continued on next page.)

Primary Examiner—David Martin
Assistant Examiner—Thanh Yen Tran
(74) Attorney, Agent, or Firm—Chapin & Huang, L.L.C.; David E. Huang, Esq.

(57) ABSTRACT

A latching apparatus has a guide member, a circuit board attachment member which is configured to attach to a circuit board, and a control assembly. The control assembly is configured to (i) retain the circuit board attachment member within a retaining range of the guide member when the guide member is unlocked from a receptacle member, and (ii) un-restrict the circuit board attachment member such that the circuit board attachment member is movable outside of the retaining range of the guide member when the guide member is locked with the receptacle member.

21 Claims, 18 Drawing Sheets

U.S. PATENT DOCUMENTS

| | | | |
|---|---|---|---|
| 5,144,611 A | 9/1992 | Engler et al. | 369/71 |
| 5,204,925 A | 4/1993 | Bonanni et al. | 385/89 |
| 5,220,703 A | 6/1993 | Kanayama et al. | 15/210.1 |
| 5,257,332 A | 10/1993 | Pimpinella | 385/59 |
| 5,283,851 A | 2/1994 | Vergnolle | 385/134 |
| 5,337,396 A | 8/1994 | Chen et al. | 385/92 |
| 5,348,487 A | 9/1994 | Marazzi et al. | 439/138 |
| 5,379,362 A | 1/1995 | Kawamura | 385/92 |
| 5,394,503 A | 2/1995 | Dietz, Jr. et al. | 385/135 |
| 5,425,831 A | 6/1995 | Grimes et al. | 156/179 |
| 5,513,293 A | 4/1996 | Holland et al. | 385/134 |
| 5,598,494 A | 1/1997 | Behrmann et al. | 385/59 |
| 5,598,495 A | 1/1997 | Rittle et al. | 385/75 |
| 5,725,154 A | 3/1998 | Jackson | 239/135 |
| 5,768,738 A | 6/1998 | Lee | 15/210.1 |
| 5,778,123 A | 7/1998 | Hagan et al. | 385/76 |
| 5,800,198 A * | 9/1998 | Morlion et al. | 439/372 |
| 5,838,856 A | 11/1998 | Lee | 385/54 |
| 5,845,028 A | 12/1998 | Smith et al. | 385/59 |
| 5,845,036 A | 12/1998 | De Marchi | 385/139 |
| 5,920,670 A | 7/1999 | Lee et al. | 385/78 |
| 5,940,560 A | 8/1999 | De Marchi et al. | 385/58 |
| 6,005,991 A | 12/1999 | Knasel | 385/76 |
| 6,041,652 A | 3/2000 | Stewart | 73/504.04 |
| 6,102,747 A * | 8/2000 | Paagman | 439/701 |
| 6,233,376 B1 | 5/2001 | Updegrove | 385/14 |
| 6,259,840 B1 | 7/2001 | Munoz-Bustamante et al. | 385/39 |
| 6,270,262 B1 | 8/2001 | Hudgins et al. | 385/88 |
| 6,296,398 B1 | 10/2001 | Lu | 385/60 |
| 6,300,082 B1 | 10/2001 | Erb et al. | 435/7.1 |
| 6,304,436 B1 * | 10/2001 | Branch et al. | 361/683 |
| 6,304,690 B1 | 10/2001 | Day | 385/24 |
| 6,305,848 B1 | 10/2001 | Gregory | 385/53 |
| 6,361,218 B1 | 3/2002 | Matasek et al. | 385/60 |
| 6,419,399 B1 | 7/2002 | Loder et al. | 385/53 |

OTHER PUBLICATIONS http://multimedia.mmm.com/mws/mediawebserver.dyn!666666Ozjcf6Ivs6Evs666tQ3c7rr; Visited Site on Apr. 24, 2002; 1 Page of Picture.

European Patent Office; Patent Abstracts of Japan; Publication No.: 2002031739; Publication Date Jan. 31, 2002; Application No.: 2000215365; Applicant: NTT Advanced Technology Corp.; 1 Page.

Molex, HBMT ™MT High Density Backplane Interconnect System, Mounting Style: Rivet or Screw, Housing: UL V–O.

New York Institute of Photography; Tips for Better Photographs; http://www.nyip.com/sub_idx_pgs/referidx/camera_corner_0599.html; 4 pages.

* cited by examiner

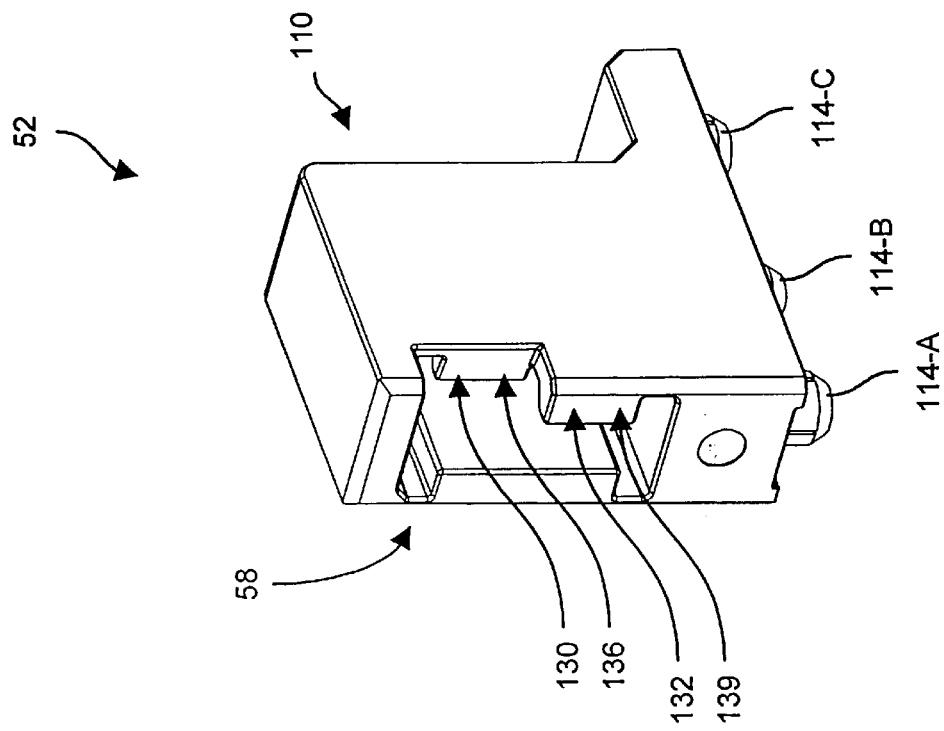
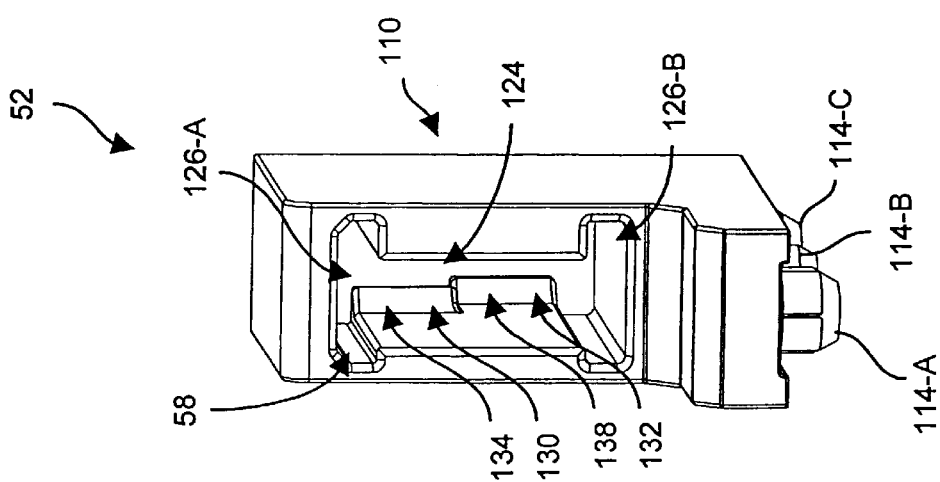

TECHNIQUES FOR CONNECTING A SET OF CONNECTING ELEMENTS USING AN IMPROVED LATCHING APPARATUS

BACKGROUND OF THE INVENTION

Formation of a set of fiber optic connections (i.e., one or more fiber optic connections) typically involves mating a female fiber optic connector with a male fiber optic connector. One conventional female fiber optic connector includes a female multi-fiber ferrule which (i) holds a set of polished fiber ends and (ii) defines a pair of alignment holes (i.e., one alignment hole on each side of the set of polished fiber ends). The female connector further includes a rectangular-shaped female housing which (i) rigidly positions the ferrule therein, and (ii) defines a pair of alignment slots (i.e., one alignment slot on each side of the ferrule).

Likewise, one conventional male fiber optic connector includes a multi-fiber ferrule which holds a similar set of polished fiber ends, and a pair of alignment pins which extend from the ferrule (i.e., one alignment pin on each side of the set of polished fiber ends). The male connector further includes a male housing having a rectangular-shaped base portion in which the ferrule resides, and a pair of alignment beams. The alignment beams extend from the base portion in a parallel manner (i.e., one alignment beam on each side of the ferrule).

During connection, the alignment beams of the male fiber optic connector simultaneously engage the alignment slots of the female fiber optic connector thus bringing the ferrules and their polished fiber optic ends together. The alignment pins extending from the ferrule of the male connector then engage with the alignment holes of the ferrule of the female connector to precisely align the sets of fiber ends to form a healthy and robust set of fiber optic connections.

The housings of some fiber optic connectors hold multiple ferrules in a contained but side-by-side manner. One conventional off-the-shelf family of female and male connectors uses housings, which have been tooled to hold three ferrules. That is, the housing of the female connector holds three ferrules, and the housing of the male connector holds three ferrules such that, when the female and male connectors mate, three times the number of fiber optic connections are formed compared to that formed by the mating of a single pair of ferrules. Another conventional off-the-shelf family of female and male connectors uses housings, which have been tooled to hold four ferrules. Such connectors are well suited for high-density applications such as when connecting a fiber optic circuit board to a fiber optic backplane.

There are different conventional approaches to connecting a fiber optic circuit board to a fiber optic backplane using fiber optic connectors. One conventional approach to connecting a fiber optic circuit board to a fiber optic backplane (hereinafter called "the rigidly mounted connector approach") uses a simple, straightforward design. In particular, the male fiber optic circuit board connector rigidly attaches to the circuit board (e.g., with screws). When the circuit board inserts into a card cage assembly and engages a backplane, the male fiber optic circuit board connector mates with a corresponding female fiber optic circuit board connector mounted to the backplane. The male connector, which is rigidly attached to the circuit board, stays in place relative to the female connector on the backplane due to the maintained positioning of the circuit board relative to the backplane (e.g., using circuit board levers which hold the circuit board within a card cage assembly mounted to the backplane). Simultaneously, the connectors operate in a spring-loaded manner to enable the ferrules of the connectors to properly align regardless of subtle differences in board tolerances.

Another conventional approach to connecting a fiber optic circuit board to a fiber optic backplane (hereinafter called "the floating housing approach") uses a spring-loaded male fiber optic circuit board connector having a male housing which loosely attaches to the circuit board but which is toleranced to float in the Z-direction (toward or away from the backplane) and is biased by a spring to always apply force against the backplane when the circuit board is in a fully-engaged position within a card cage assembly. Accordingly, if any of the components of the circuit board and/or the backplane are slightly out of tolerance, the ability of the male housing to float in the Z-direction eliminates placement of additional stresses on the circuit board (e.g., stresses on solder joints of simultaneously connected electrical components) which could compromise connectivity and perhaps damage the boards. Some manufacturers have attempted to remove the connector biasing and to provide a relaxed isolated latching using an added floating body.

SUMMARY OF THE INVENTION

Unfortunately, there are deficiencies to the above-described conventional approaches to connecting fiber optic circuit boards and backplanes. For example, in the conventional rigidly mounted connector approach, it is difficult to precisely control all aspects of circuit board and backplane alignment such as card cage and board tolerances, component placement, uniformity from system to system, etc. Accordingly, it is common for circuit boards and backplanes which have rigidly mounted components to encounter high stresses and forces while engaging each other. In some situations, the stresses can be so great that bonds of some components (e.g., solder joints of electrical connectors neighboring fiber optic connectors) can fatigue and fracture. Such a situation may surface not as a completely defective circuit board, but as an intermittent failure resulting in costly field service calls, as well as lost goodwill and a lost reputation for quality.

Additionally, in the conventional floating housing approach, the housing of the connector is typically tooled to hold a particular number of ferrules (e.g., three) and is thus limited in flexibility. That is, the housing is suitable for a particular application but is unsuitable for other applications. To accommodate a different application (e.g., applications which require five ferrules), the manufacturer must retool for the different application, which is an expensive endeavor (e.g., the manufacturer must redefine and retest connector housing layouts and thickness due to changes in holding forces caused by changes in spring densities).

In contrast to the above-described conventional approaches, the invention is directed to techniques for connecting elements using an improved latching apparatus. The apparatus employs a control assembly (e.g., a system of control arms) which operates to connect the elements together in a manner that permits substantial connector movement in the Z-direction, as well as enables easy scalability and customization with minimal or no retooling. With substantial Z-directional movement permitted, there is little or no Z-directional board stress passed on from connectors to other locations (e.g., to electrical connectors having fragile solder joints). Furthermore, such easy scalability enables a manufacturer to offer a variety of connector configurations without incurring significant retooling and redesigning costs.

One embodiment of the invention is directed to a latching apparatus having a guide member, a circuit board attachment member that is configured to attach to a circuit board, and a control assembly. The control assembly is configured to (i) retain the circuit board attachment member within a retaining range of the guide member when the guide member is unlocked from a receptacle member, and (ii) un-restrict the circuit board attachment member such that the circuit board attachment member is movable outside of the retaining range of the guide member when the guide member is locked with the receptacle member. When the circuit board attachment member is mounted to a circuit board (e.g., a daughter card) and when the receptacle member is mounted to another circuit board (e.g., a backplane, a motherboard, etc.), there is little or no transmission of stresses due to tolerance buildups along a Z-axis (e.g., a Z-direction of one of the circuit boards and along the guide member) due to ability of the circuit board attachment member to move outside of the retaining range of the guide member when the guide member is locked with the receptacle member.

Another embodiment is directed to a circuit board module which includes (a) a first receptacle for receiving a guide member, the first receptacle being adapted to receive a floatable mounting mechanism for attachment to a first planar device; (b) a second receptacle for supporting a slideable guide member, the receptacle being adapted for a fixed mounting mechanism for attachment to a second planar device; (c) a guide member slideably coupled to and within the second receptacle for attachment to the first receptacle; (d) a first retention mechanism (e.g., an arm member) provided between the second receptacle and the guide member, to engage the guide member with the second receptacle when the guide member is not coupled to the first receptacle; (e) a second retention mechanism (e.g., another arm member) provided between the first receptacle and the guide member, to engage the guide member with the first receptacle while the second receptacle is still coupled to the guide member; (f) a first separation mechanism (e.g., a defined tab) provided between the first receptacle and the guide member to separate the first retention mechanism from the second receptacle when the guide member is retained to the first receptacle by means of the second retention mechanism; and (h) a second separation mechanism provided between the second receptacle and the guide member, to separate the second retention mechanism when the second receptacle has been re-coupled to the guide member and the first receptacle is being decoupled from the guide member.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 5A shows a perspective view of a circuit board attachment member of the latching apparatus of FIGS. 2A and 2B.

FIG. 5B shows a perspective view of the circuit board attachment member of FIG. 5A from the opposite side.

DETAILED DESCRIPTION

The invention is directed to techniques for connecting elements together (e.g., fiber optic interface elements) using an improved latching apparatus. The apparatus employs a control assembly (e.g., an assemblage of control arms) which operates to connect the elements in a manner that permits substantial connector movement in the Z-direction, as well as enables easy scalability and customization with minimal or no retooling. With substantial Z-directional movement available, there is little or no Z-directional board stress transmitted from connectors to other locations once the system is mated (e.g., to electrical connectors having fragile solder joints, to fatigue or crack circuit board traces, etc.). Furthermore, such easy scalability enables a manufacturer to offer a variety of connector configurations without incurring significant retooling and redesigning costs.

Figure 1A:
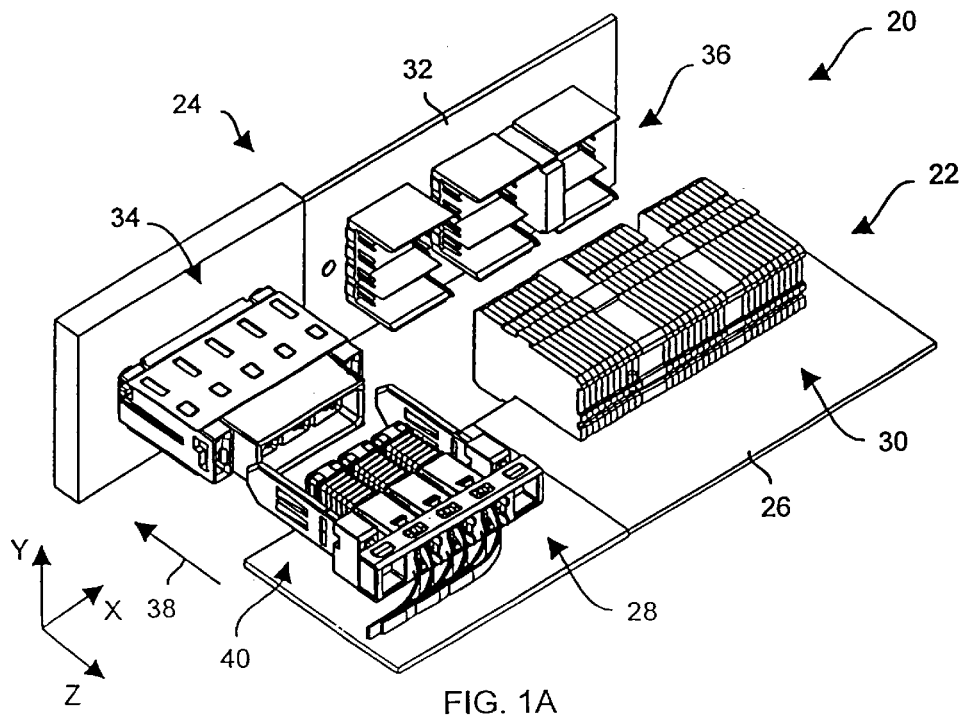
FIG. 1A shows a perspective view of a connection system which is suitable for use by the invention, the connecting system being shown in an unconnected state.
Figure 1B:
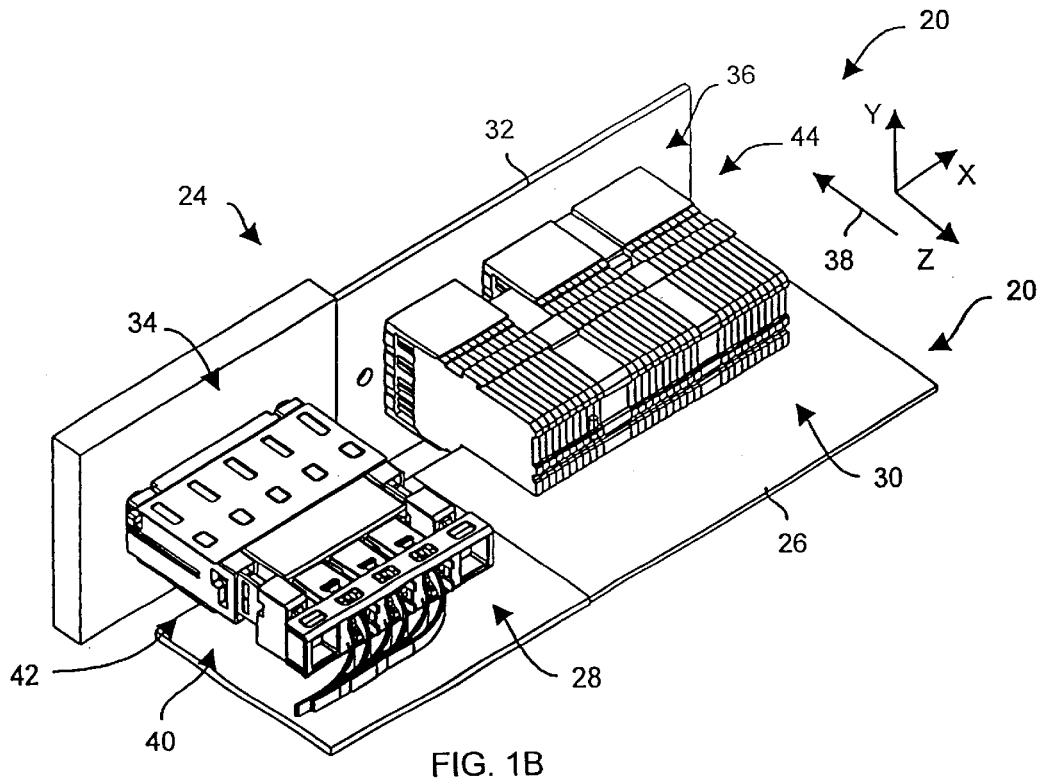
FIG. 1B shows a perspective view of the connection system of FIG. 1A in a connected state.

FIGS. 1A and 1B shows a connection system 20 which is suitable for use by the invention. The connection system 20 includes a first circuit board module 22 and a second circuit board module 24. By way of example only, the first circuit board module 22 is configured as a daughter card (hereinafter referred to as the daughter card 22) having a circuit board 26, a fiber optic connector 28 and an electrical connector 30. The second circuit board module 24 is configured as a backplane (hereinafter referred to as the backplane 24) having a circuit board 32, a fiber optic connector 34 and an electrical connector 36.

When the daughter card 22 connects with the backplane 24 (see FIG. 1B), the daughter card 22 moves along the Z-axis toward the backplane 24 (i.e., in the negative Z-direction as shown by the arrow 38) such that (i) the fiber optic connector 28 of the daughter card 22 connects with the fiber optic connector 34 of the backplane 24, and (ii) the electrical connector 30 of the daughter card 22 connects with the electrical connector 36 of the backplane 24. As will be discussed in further detail below, the fiber optic connectors 28, 34 employ a latching apparatus 40 which permits substantial Z-directional movement while maintaining a set of healthy and robust fiber optic connections 42 therein.

With substantial Z-directional movement available, there is little or no stress transmitted by the fiber optic connectors 28, 34 to the electrical connectors 30, 36 that would otherwise jeopardize electrical connectivity 44 provided by the electrical connectors 30, 36 (e.g., that would fatigue and/or break solder joints, that would generate intermittent electrical contact, etc.). Rather, inaccuracies due to tolerance buildup, imprecision in component placement, and other tolerance differences, are accommodated by the latching apparatus 40 which holds connecting elements together while allowing substantial movement of the connecting elements relative to the circuit boards 26, 32.

In one arrangement, there is no force applied to bias the connector 28 toward the backplane 24 once the connectors 24, 34 have mated. That is, in contrast to the earlier-described conventional floating housing approach in which a spring-loaded male connector includes a spring that constantly biases the connector toward the backplane (i.e., in which constant force is applied against the backplane), the connector 24 is free to float in a non-biased manner in either direction along the Z-axis relative to the circuit board 22 after the connectors 24, 34 connect with each other, thereby relaxing the forces after latching. Further details of the invention will now be provided with reference to FIGS. 2A and 2B.

Figure 2A:
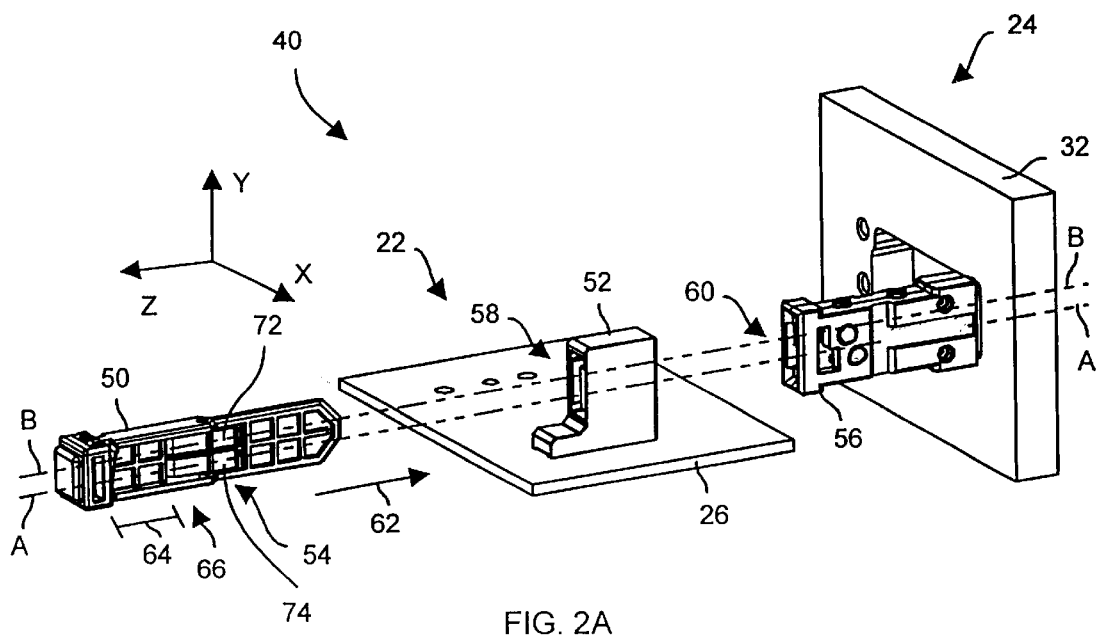
FIG. 2A shows a perspective view of a latching apparatus of the connection system of FIGS. 1A and 1B, the latching apparatus being shown in an unlatched and separated state.

FIG. 2A shows a perspective view of the latching apparatus 40 used by the connectors 28, 34 of the connection system 20. On the daughter card side (i.e., on the side of the connector 28, also see FIGS. 1A and 1B), the latching apparatus 40 includes a guide member 50, a circuit board attachment member 52, and a control assembly 54 which integrates with the guide member 50. On the backplane side (i.e., on the side of the connector 34, also see FIGS. 1A and 1B), the latching apparatus 40 includes a receptacle member 56. The circuit board attachment member 52 is configured to attach to the circuit board 26 of the daughter card 22. Similarly, the receptacle member 56 is configured to attach to the circuit board 32 of the backplane 24.

The guide member 50 is configured to (i) slidably engage with the circuit board attachment member 52 and (ii) selectively engage and disengage with the receptacle member 56. Accordingly, when the circuit board attachment member 52 is attached to the circuit board 26 of the daughter card 22 and when the receptacle member 56 is attached to the circuit board 32 of the backplane 24 as shown in FIG. 2A, the guide member 50 can latch the daughter card 22 to the backplane 24 by engaging and locking with the receptacle member 56. Such engaging and locking occurs when the guide member 50 is initially loaded through a cavity 58 defined by the circuit board attachment member 52, and then moved along the Z-axis in the direction 62 toward an opening 60 defined by the receptacle member 56 (see FIG. 2A).

Figure 2B:
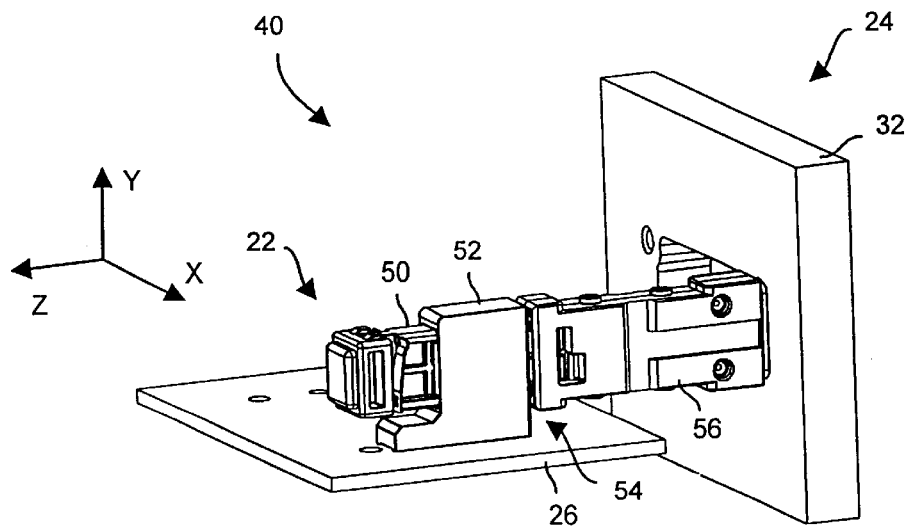
FIG. 2B shows a perspective view of the latching apparatus of FIG. 2A in a latched and floating state.

FIG. 2B shows the guide member 50 engaged with and locked to the receptacle member 56. Accordingly, the daughter card 22 is now considered latched to the backplane 24. In this situation, the guide member 50 is held rigidly by the receptacle member 56. Accordingly, any connecting elements rigidly attached to the guide member 50 and to the receptacle member 56 can connect in a robust and healthy manner. However, the guide member 50 is only loosely connected to the circuit board attachment member 52 in that there is substantial Z-direction freedom of movement available. As a result, there is minimal stress (if any) transferred from the latching apparatus 40 to the circuit boards 26, 32 that could otherwise jeopardize other connecting components (e.g., the solder joints of the electrical connectors 30, 36 in FIG. 1B) or that could fatigue or crack circuit board traces, etc.

As will be explained in further detail below, locking and unlocking of the latch apparatus 40 is under control of the control assembly 54 which works in conjunction with the circuit board attachment member 52 and the receptacle member 56. In particular, the control assembly 54 is configured to retain the circuit board attachment member 54 within a retaining range 64 of the guide member 50 when the guide member 50 is unlocked from the receptacle member 56. Such retention prevents the guide member 50 from inadvertently escaping from the circuit board attachment member 52 prior to latching and during the latching process.

Additionally, the control assembly 54 is further configured to un-restrict the circuit board attachment member 52 such that the circuit board attachment member 52 is movable outside of the retaining range 64 of the guide member 50 (i.e., is movable to a location 66 outside the retaining range 64) when the guide member 50 is locked with the receptacle member 56. It is this operation that provides more freedom of movement along the Z-axis than was available prior to latching. Accordingly, after latching process is complete, there are less board stresses, if any, generated by the latching of the connectors 28, 34.

It should be understood that the latch apparatus 40 is well-suited for connecting a circuit board which forms both fiber optic connections and electrical connections with another circuit board, e.g., see the daughter card 22 and the backplane 24 of FIGS. 1A and 1B. In particular, the freedom of movement in the Z-direction allows the circuit boards to overcome issues relating to electrical wipe (e.g., relatively high amounts of mating forces required to establish electrical connections). As will now be explained, such freedom of movement enables a staggered mating sequence (e.g., connection of fiber optic connectors first, then connection of electrical connectors) so that the connectors work in harmony rather than compete with each other.

By way of example only, initial movement of the daughter card 22 toward the backplane 24 (see the arrow 38 in FIG. 1A) (i) results in latching of the latch apparatus 40 of the fiber optic connectors 28, 34, i.e., locking the fiber optic connector 28 with the fiber optic connector 34 to for a set of robust fiber optic connections 42, and (ii) provides substantial freedom of movement in the Z-direction. Further movement of the daughter card 22 toward the backplane 24 results in engagement of the electrical connectors 30, 36 to form a healthy set of electrical connections 44. As the electrical connectors 30, 36 connect with each other (e.g., under 150 to 200 lbs. of force), there is little or no stress on the fiber optic connectors 28, 34 since they float due to the ability of the guide members 50 to move within the circuit board attachment members 52. Additionally, after connection of the electrical connectors 30, 36, there is little or no competition between fiber optic connectors 28, 34 and the electrical connectors 30, 36 due accumulated tolerances (e.g., differences in board uniformity, planarity, positional tolerancing, board lock location, component tolerancing, connector binding, etc.). Further details of the invention will now be provided with reference to FIGS. 3, 4A and 4B.

Figure 3:
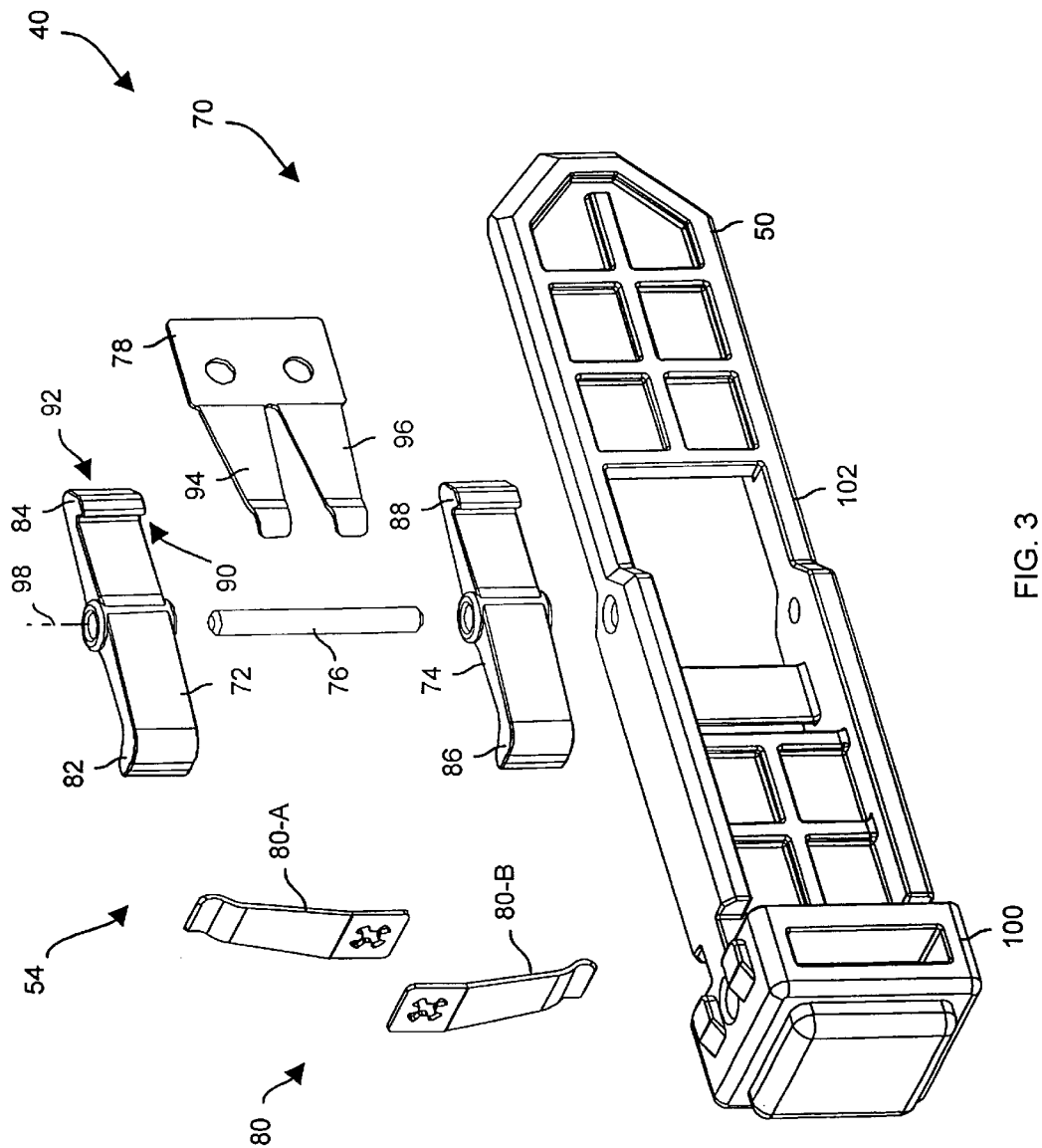
FIG. 3 shows an exploded view of a portion of the latching apparatus of FIGS. 2A and 2B.

FIG. 3 shows an exploded view of a portion 70 of the latching apparatus 40. The portion 70 includes the guide member 50 and the control assembly 54. As shown, the control assembly 54 includes a retaining range control arm 72, a receptacle locking control arm 74, a pivot member 76, and a multi-spring member 78 and springs 80-A, 80-B (collectively, springs 80). The retaining range control arm 72 includes a wedge-shaped tab 82 and another wedge-shaped tab 84. Similarly, the receptacle locking control arm 74 includes a wedge-shaped tab 86 and another wedge-shaped tab 88. Each wedge-shaped tab 82, 84, 86 and 88 includes an inner face 90 and an exterior face 92 (e.g., see the tab 84). The multi-spring member 78 includes a retaining range control arm spring 94 for biasing the retaining range control arm 72, and a receptacle locking control arm spring 96 for biasing the receptacle locking control arm 74.

Figure 4A:
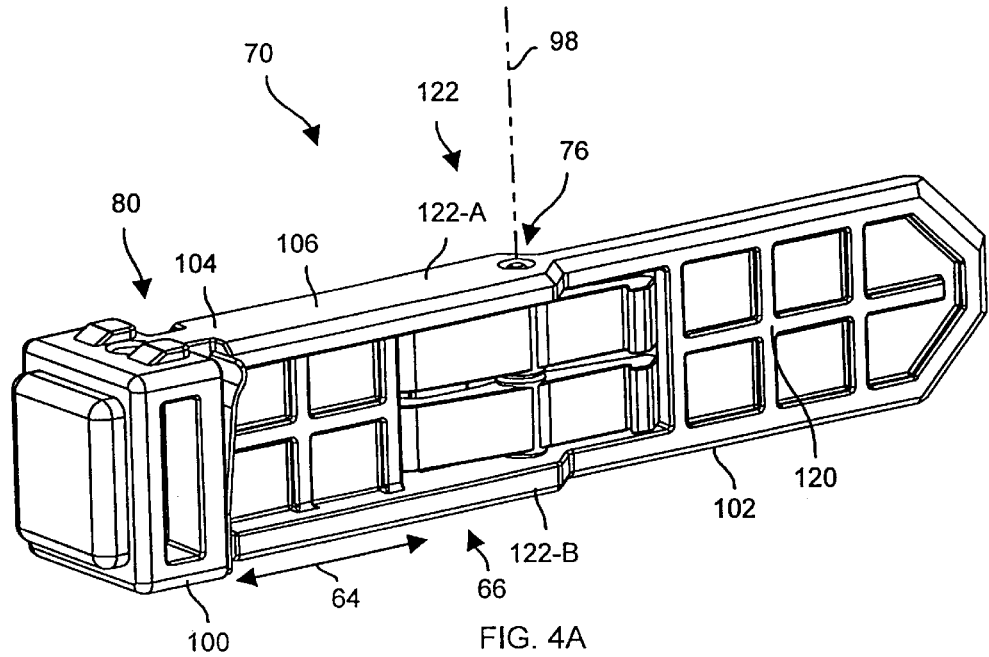
FIG. 4A shows a perspective view of the portion of the latching apparatus of FIG. 4A in an assembled state.
Figure 4B:
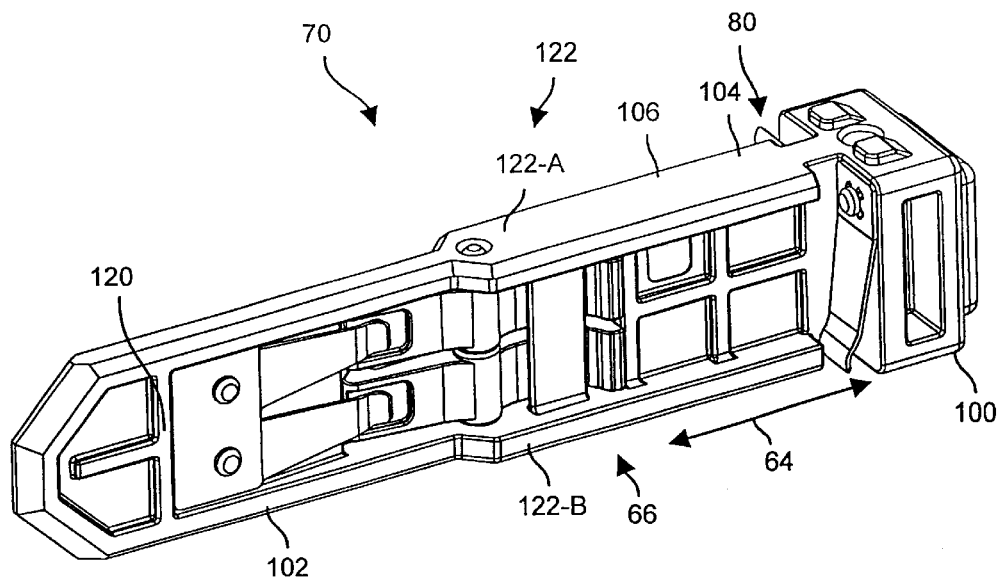
FIG. 4B shows a perspective view of the portion of the latching apparatus of FIG. 4B from the opposite side.

FIG. 4A shows a first angled view of the control assembly 54 assembled onto the guide member 50. FIG. 4B shows a second angled view of the control assembly 54 assembled onto the guide member 50 (i.e., a view from the other side of that shown in FIG. 4A). As shown in FIGS. 4A and 4B, the pivot member 76 (e.g., a guide pin which inserts through holes in the guide member 50) pivotally couples the retaining range control arm 72 and the receptacle locking control arm 74 to the guide member 50. That is, the arms 72, 74 share the same pivot axis 98 as defined by the pivot member 76.

Once the retaining range control arm 72 is installed onto the guide member 50, the retaining range control arm 72 is configured to retain the circuit board attachment member 52 (also see FIGS. 2A and 2B) within the retaining range 64 of the guide member 50 when the retaining range control arm 72 is in a first pivoted retaining range control arm orientation relative to the guide member 50. Additionally, the retaining range control arm 72 is configured to un-restrict the circuit board attachment member 52 such that the circuit board attachment member 52 is movable outside of the retaining range 64 of the guide member 50 (i.e., is movable within a larger range 66 which overlaps and extends along the Z-axis beyond the retaining range 64) when the retaining range control arm 72 is in a second pivoted retaining range control arm orientation that is different than the first pivoted retaining range control arm orientation.

As shown in FIGS. 3, 4A and 4B, the guide member 50 includes a base portion 100 which, as will be explained and shown in further detail later, is configured to modularly fit into any of multiple module positions of a holder of a connecting device. The guide member 50 further includes a blade-shaped portion 102 which is integral with the base portion 100. The blade-shaped portion 102 is configured to slide into a blade-shaped aperture defined by the receptacle member 52 (see the cavity 58 in FIG. 2A).

As shown in FIGS. 4A and 4B, the springs 80 mount to the base portion 100 of the guide member 50. When the circuit board attachment member 52 resides in the retaining range 64 of the guide member 50, the springs 80 bias the circuit board attachment member 52 from a location 104 within the retaining range 64 toward a location 106 within the retaining range 64 and away from the base portion 100. Further details of the invention will now be provided with reference to FIGS. 5A and 5B.

FIG. 5A shows a first angled view of the circuit board attachment member 52, and FIG. 5B shows a second angled view (i.e., from the other side of that show in FIG. 5B). As shown in FIGS. 5A and 5B, the circuit board attachment member 52 includes a slide portion 110 and a set of protrusions 114-A, 114-B, 114-C (collectively, protrusions 114). The set of protrusions 114 are integral with the slide portion 110, and are configured to insert into holes of the daughter card circuit board 26. A user can then easily fasten the circuit board attachment member 52 to the circuit board 26 (e.g., by adding screws into the protrusions 114 through the opposite end of the circuit board 26, by affixing an attachment into the circuit board holes, etc.).

The slide portion 110 defines the cavity 58 (also see FIG. 2A) through which the guide member 50 slides. In particular, and as shown in FIG. 4A, the blade portion 102 of the guide member 50 which defines the large range 66 is substantially I-shaped. That is, that portion 102 defines a vertical portion 120 which is terminated by two horizontal portions 122-A, 122-B (collectively, horizontal portions 122). The vertical portion 120 of the guide member 50 fits through a vertical portion 124 (i.e., a volume or space) of the cavity 58, and the horizontal portions 122-A, 122-B of the guide member 50 fits through horizontal portions 126-A, 126-B of the cavity 58.

It should be understood that, when the guide member 50 slidably engages with the circuit board attachment member 52 through the I-shaped cavity 58 of the circuit board attachment member 52, a very minor amount of freedom of movement (e.g., slack or play) exists between the guide member 50 and the circuit board attachment member 52 in the X-direction and the Y-direction. Nevertheless, such freedom of movement in the X and Y directions further avoids transferring stresses from the latching apparatus 40 to the circuit boards 26, 32.

As shown in FIGS. 5A and 5B, the slide portion 110 of the circuit board attachment member 52 further defines a tab 130 for actuating the retaining range control arm 72 of the control assembly 54, and a tab 132 for actuating the receptacle locking control arm 74 of the control assembly 54. In particular, the tab 130 defines a ramp 134 (FIG. 5B) and a back 136. As will be explained in further detail later, the ramp 134 is configured to move the retaining range control arm 72 from a first orientation (put in the first orientation due to biasing from the spring 94, see FIG. 4) to a second orientation (due to actuation of the arm 72 against the ramp 134).

Similarly, the tab 132 defines a ramp 138 and a back 139. As will be explained in further detail later, the ramp 138 is configured to move the receptacle locking control arm 74 from a first orientation (put in the first orientation due to biasing from the spring 96, see FIG. 4) to a second orientation (due to actuation of the arm 74 against the ramp 138).

It should be understood that the tabs 130, 132 are staggered relative to each other so that, as the guide member 50 slides further into the circuit board attachment member 52, the retaining range control arm 72 first actuates to lock the circuit board attachment member 52 within the retaining range 64 of the guide member 50. That is, the ramp 134 of the tab 130 moves the arm 72 from the first orientation to the second orientation to allow the circuit board attachment member 52 to move from a location outside the retaining range 64 into the retaining range 64. The tab 130 then moves past the arm 72 enabling the spring 94 to again bias the arm 72 back to the first orientation putting the back 136 of the tab 130 and an exterior face of the tab 82 of the arm 72 in direct contact. At this point, the back 136 of the tab 130 interferes with the exterior face of the arm 72 thus preventing the circuit board attachment member 52 from moving out of the retaining range 64.

If the circuit board attachment member 52 continues to move to the base portion 100 of the guide member 50 (e.g., see FIGS. 4A and 5A), the ramp 138 of the tab 132 will eventually move the arm 74 from a first orientation to a second orientation. As will be explained shortly, this operation enables the arm 74 to unlock from the receptacle member 56. Further details of the invention will now be provided with reference to FIGS. 6A and 6B.

Figure 6A:
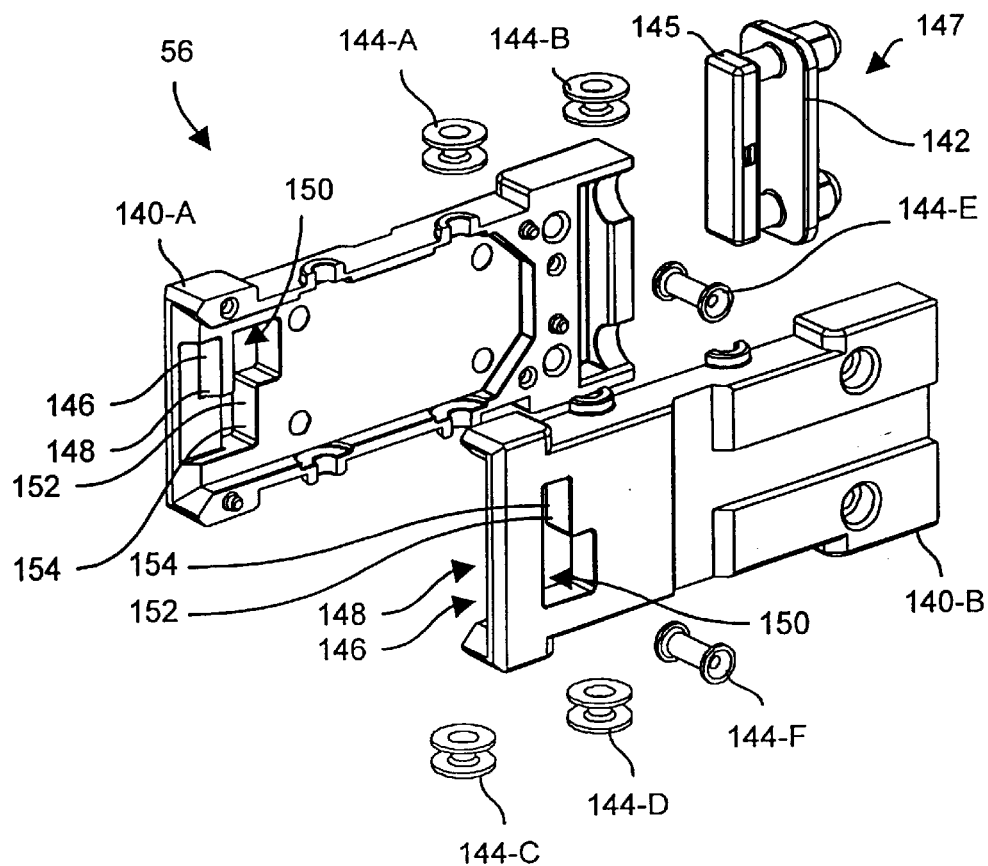
FIG. 6A shows an exploded view of a receptacle member of the latching apparatus of FIGS. 2A and 2B.

FIG. 6A shows an exploded view of the receptacle member 56 (also see FIGS. 2A and 2B). As shown, the receptacle member 56 includes side members 140-A, 140-B (collectively, side members 140), a circuit board attachment member 142, and hardware 144-A, 144-B, 144-C, 144-D, 144-E and 144-F (collectively, hardware 144) for holding the side members 140 together and thus retaining the circuit board attachment member 142 in a fixed position. The circuit board attachment member 142 includes a base portion 145 for engaging with the side members 140, and a set of protrusions 147 for attaching to the circuit board 32 of the backplane 24 (also see FIGS. 1A and 1B). The set of protrusions 147 form a unitary member with the base portion 145, and are configured to insert into holes of the backplane circuit board 32. A user can then easily fasten the circuit board attachment member 142 (and the receptacle member 56 as a whole) to the backplane circuit board 32 (e.g., by adding screws into the protrusions 147 through the opposite end of the circuit board 32, by affixing an attachment into the circuit board holes using glue, etc.).

It should be understood that, when the circuit board attachment member 142 installs together with the receptacle side members 140-A, 140-B, a minor amount of freedom of movement (e.g., slack or play) exists between the body formed by the receptacle side members 140 and the circuit board attachment member 142 in the X-direction and the Y-direction. In one arrangement, the base portion 145 of the circuit board attachment member 142 includes posts that prevent the side members 140-A, 140-B from major rotation but allow minor or limited rotation (i.e., a circular range of freedom) allowing for true-positional placement in the X and Y direction. This freedom of movement in the X-Y plane reduces the likelihood of transferring stresses (e.g., X-Y displacement stresses, torques and angular stresses, twisting stresses, etc.) from the latching apparatus 40 to the circuit boards 26, 32 (e.g., due to a buildup of tolerances).

Figure 6B:
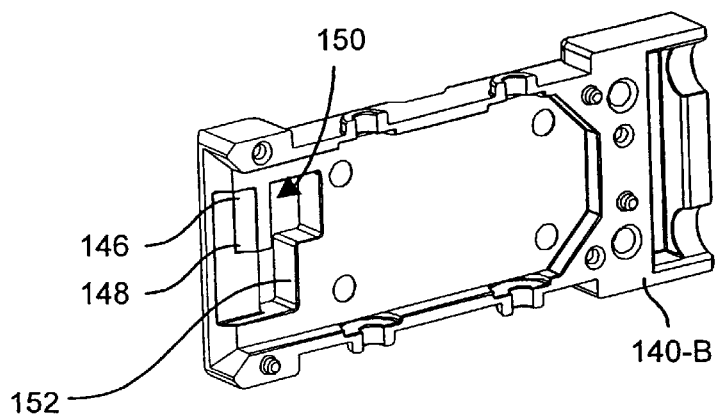
FIG. 6B shows a side member of the receptacle member of FIG. 6A.

FIG. 6B shows a side of the side member 140-B which is opposite that shown in

FIG. 6A. By way of example only, and as shown in FIG. 6B, the side member 140-B is identical to the side member 140-A. This feature of the invention enables the manufacturer to minimize costs by making only one type of side member for use as sides of the receptacle member 56 rather than two types. In one arrangement the entire receptacle member 56 is made as a singularly-formed, unitary member, i.e., one part.

As shown in both FIGS. 6A and 6B, the side members 140 define (in addition to the opening 60, see FIG. 2A) a tab 146 having a ramp 148 and a back 150, and another tab 152 defining a surface 154. As will be explained in further detail shortly, the ramp 148 of the tab 146 actuates the receptacle locking control arm 74 of the control assembly 54 by moving the arm 74 from a first orientation to a second orientation. Once the tab 146 passes the arm 74, the arm 74 returns to the first orientation due to biasing from the spring 96 (also see FIG. 3). As will be explained shortly, this operation enables the control assembly 54 to lock the guide member 50 to the receptacle member 56.

As mentioned above and as now will be explained in further detail, the latching apparatus 40 enables the daughter card 22 to selectively latch with and unlatch from the backplane 24. This latching and de-latching operation is controllable by simply moving the daughter card 22 relative to the backplane 24. That it, there is no need for a user to directly manipulate particular portions of the latching apparatus 40. Rather, the user can simply move the daughter card 22 (to which the circuit board attachment member 52 attaches) relative to the backplane 24 (to which the circuit board attachment member 142 attaches). This operation is referred to as "blind mating" and is well-suited for applications in which a user cannot or has difficulty directly accessing connectors. With blind mating operation available, the user can simply move the circuit boards relative to each other (e.g., move the daughter card 22 relative to the backplane 24) to latch and unlatch connectors. For example, suppose that the backplane 24 resides at the back of a card cage assembly, and that the daughter card 22 slides into the card cage assembly and against the backplane 24. Further suppose that a user cannot directly access the vicinity of the backplane 24 inside the card cage assembly when the daughter card 22 is present. Fortunately, the user can simply push and pull on the daughter card 22 to move the daughter card 22 relative to the backplane 24 in order to connect the daughter card 22 to, and disconnect the daughter card 22 from, the backplane 24 due to the blind mating features provided by the latching apparatus 40.

Locking Operation

Figure 7A:
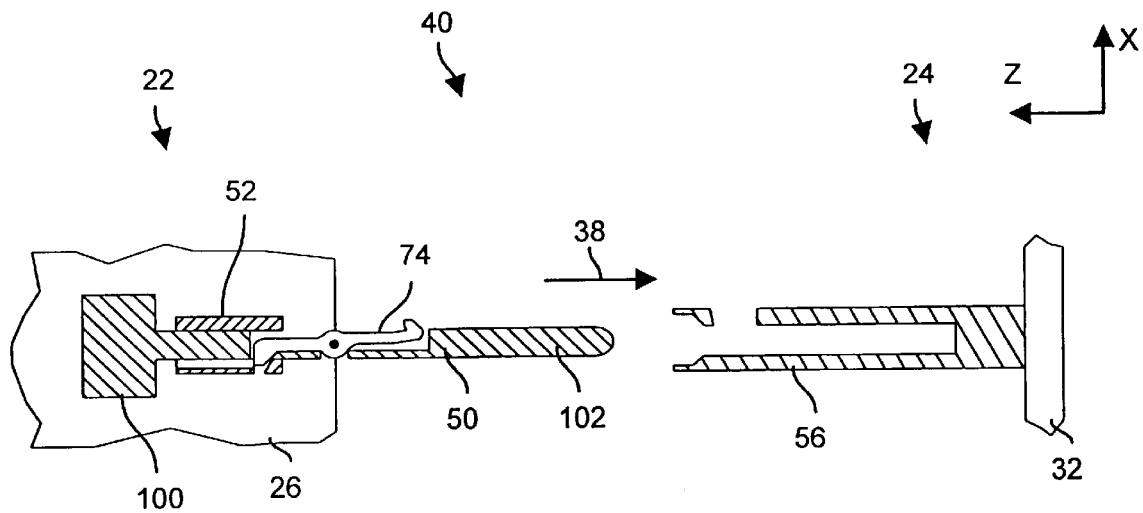
FIG. 7A shows a cross-sectional view of the latching apparatus of FIGS. 2A and 2B through a first dissecting line of FIG. 2A during an uncoupled phase of the latching process.
Figure 7B:
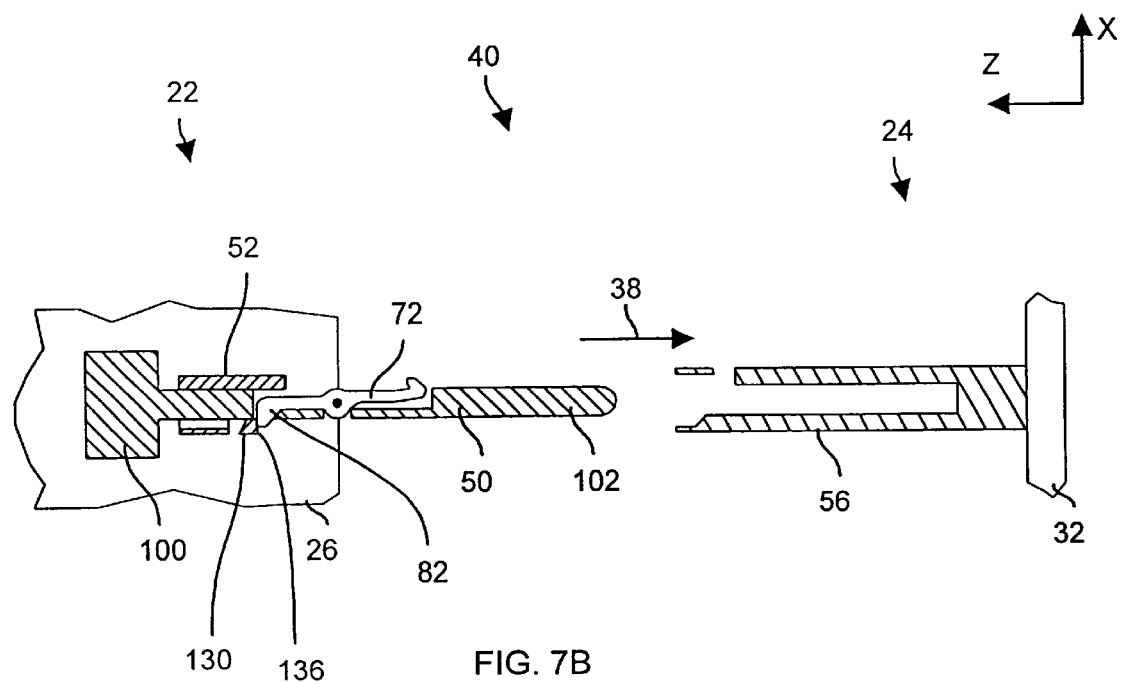
FIG. 7B shows a cross-sectional view of the latching apparatus of FIGS. 2A and 2B through a second dissecting line of FIG. 2A during the uncoupled phase of the latching process.

FIGS. 7A and 7B show cross-sectional views from a bottom angle of the latching apparatus 40 through dissecting lines A—A and B—B of FIG. 2A, respectively, at an initial point in time during the latching process. With reference back to FIG. 2A, the line A—A cuts through the receptacle locking control arm 74, and the line B—B cuts through the retaining range control arm 72.

With reference to FIG. 7A, the receptacle locking control arm 74 is biased in the counter clockwise direction by the spring 96 (FIG. 3) which is omitted from FIG. 7A for simplicity. Similarly, with reference to FIG. 7B, the retaining range control arm 72 is biased in the counter clockwise direction by the spring 94 (FIG. 3) which is omitted from FIG. 7B for simplicity.

As shown in both FIGS. 7A and 7B, the circuit board 26 of the daughter card 22 moves toward the circuit board 32 of the backplane 24 in the direction of the arrow 38 (also see FIG. 1A). In particular, the circuit board attachment member 52, which is fastened to the daughter card circuit board 26, moves the guide member 50 toward the receptacle member 56. That is, as shown in FIG. 7B, the back 136 of the tab 130 of the circuit board attachment member 52 pushes the tab 82 of the retaining range control arm 72 (also see FIG. 3) so that the blade portion 102 of the guide member 50 moves toward the opening 60 defined by the receptacle member 56 and so that the circuit board attachment member 52 is maintained within the retaining range 64 of the guide member 50 (also see FIG. 4A).

Figure 8A:
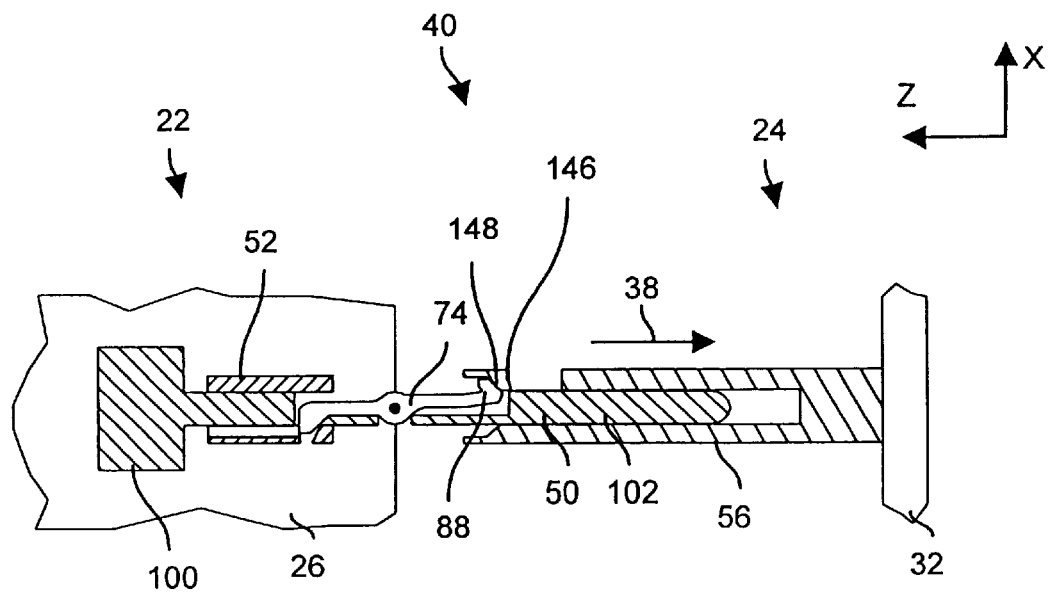
FIG. 8A shows a cross-sectional view of the latching apparatus of FIGS. 2A and 2B through the first dissecting line of FIG. 2A during an initial engagement phase of the latching process.
Figure 8B:
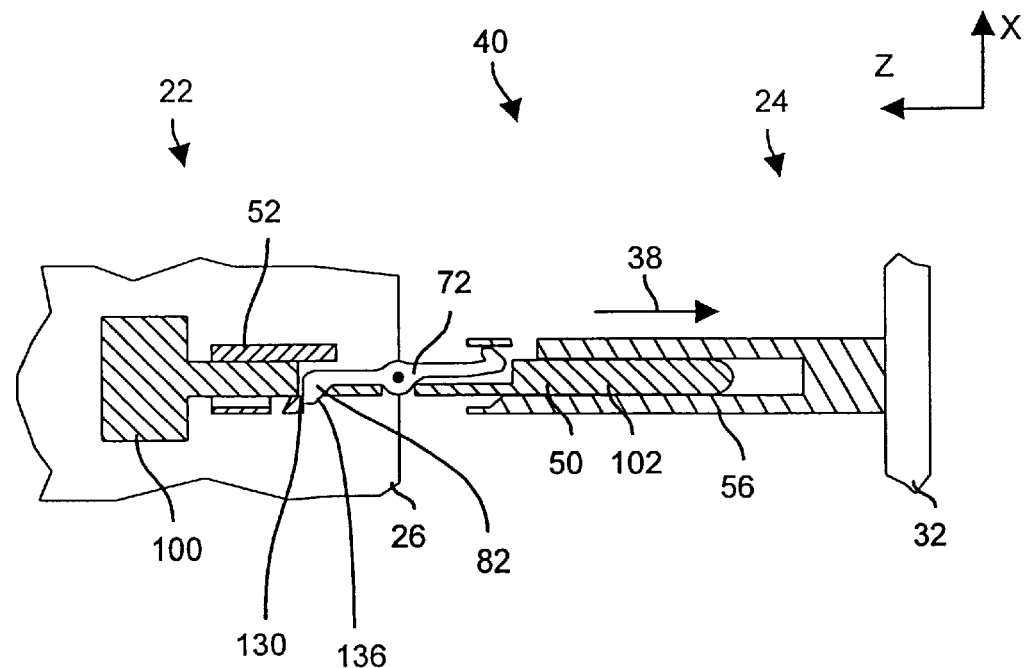
FIG. 8B shows a cross-sectional view of the latching apparatus of FIGS. 2A and 2B through the second dissecting line of FIG. 2A during the initial engagement phase of the latching process.

FIGS. 8A and 8B respectively show cross-sectional views from the bottom angle of the latching apparatus 40 through dissecting lines A—A and B—B of FIG. 2A at a next point in time during the latching process. In particular, FIG. 8A shows that the tab 88 receptacle locking control arm 74 begins to make contact with the ramp 148 of the tab 146 defined by the receptacle member 56 (also see FIGS. 6A and 6B). As shown in FIG. 8B, the back 136 of the tab 130 of the circuit board attachment member 52 continues to push the tab 82 of the retaining range control arm 72 thus moving the guide member 50 into the receptacle member 56.

Figure 9:
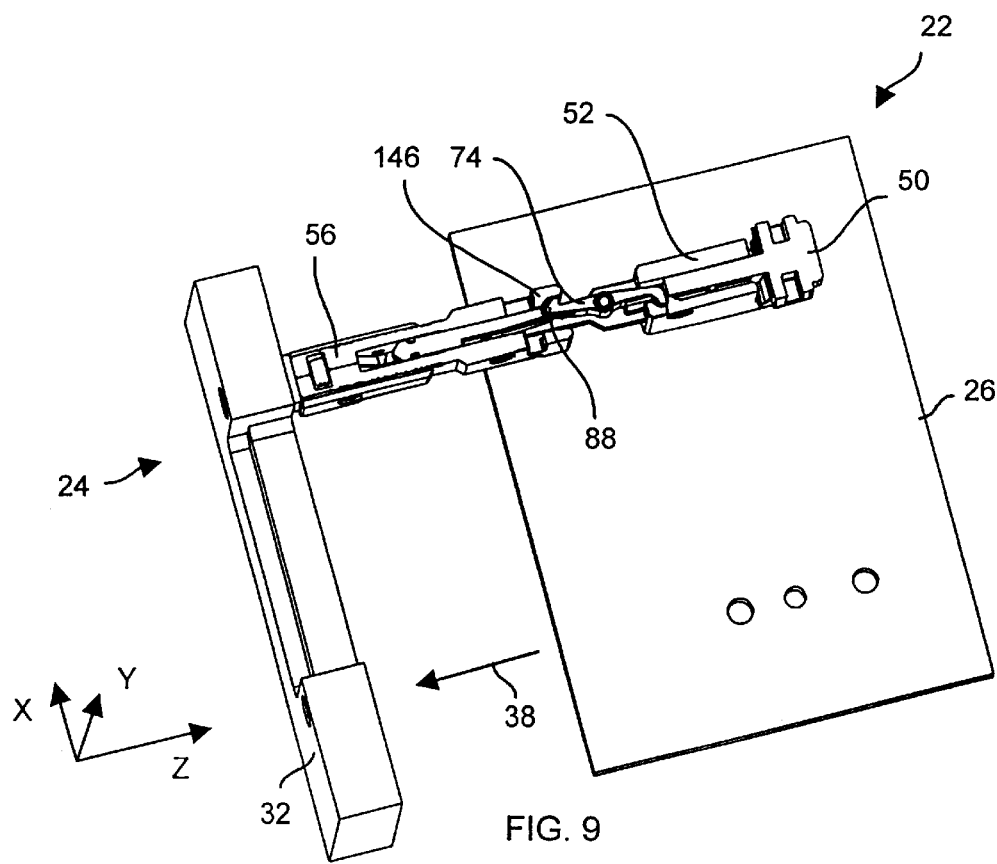
FIG. 9 shows a cutaway view of the latching apparatus of FIGS. 2A and 2B during the initial engagement phase of the latching process.

FIG. 9 shows a cutaway view (from a top angle) of the latching apparatus 40 as the guide member 50 inserts into the receptacle member 56. The ramped exterior surface of the tab 88 of the receptacle locking control arm 74 makes contact with the tab 146 of the receptacle member 56 as the guide member 50 continues to move forward along the Z-axis (i.e., in the negative Z-direction 38).

Figure 10A:
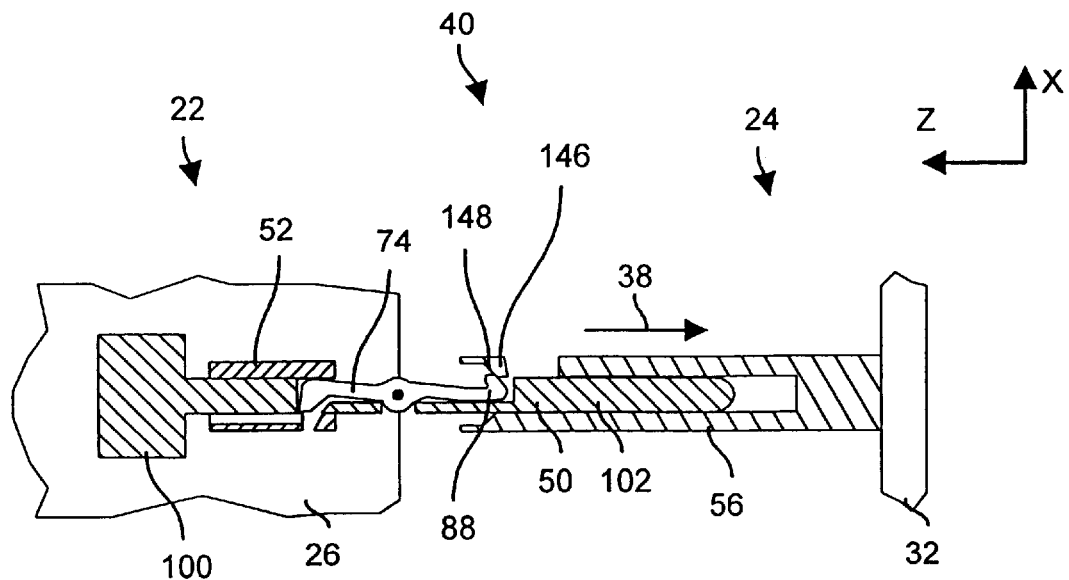
FIG. 10A shows a cross-sectional view of the latching apparatus of FIGS. 2A and 2B through the first dissecting line of FIG. 2A during a latching phase of the latching process.
Figure 10B:
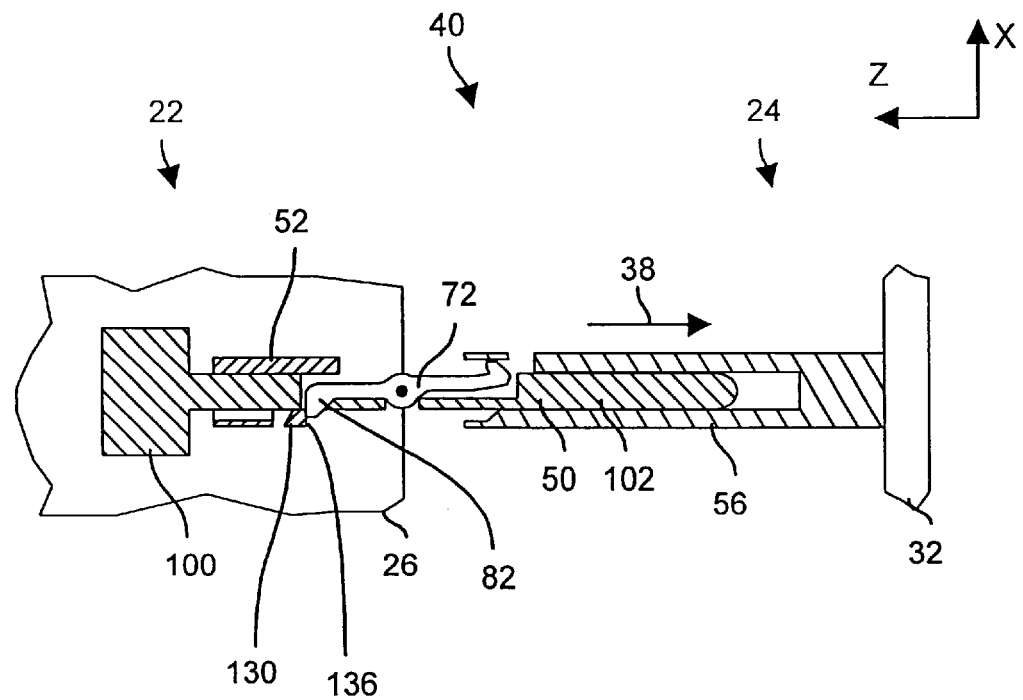
FIG. 10B shows a cross-sectional view of the latching apparatus of FIGS. 2A and 2B through the second dissecting line of FIG. 2A during the latching phase of the latching process.

FIGS. 10A and 10B respectively show cross-sectional views from a bottom angle of the latching apparatus 40 through dissecting lines A—A and B—B of FIG. 2A at yet a next point in time during the latching process. In particular, FIG. 10A shows that the receptacle locking control arm 74 has moved in the clockwise direction (from the perspective of FIG. 10A) from a first biased orientation (FIGS. 7A and 8A) to a second orientation allowing the tab 88 of the receptacle locking control arm 74 to just clear the tab 146 of the receptacle member 56. Such movement must overcome the biasing forces of the receptacle locking control arm spring 96 (FIG. 3) which pushes the arm 74 in the counterclockwise direction back toward the first orientation. As shown in FIG. 10B, the back 136 of the tab 130 of the circuit board attachment member 52 continues to push the tab 82 of the retaining range control arm 72 thus moving the guide member 50 into the receptacle member 56 and maintaining the circuit board attachment member 52 within the retaining range 64 of the guide member 50 (also see FIG. 4A).

Figure 11A:
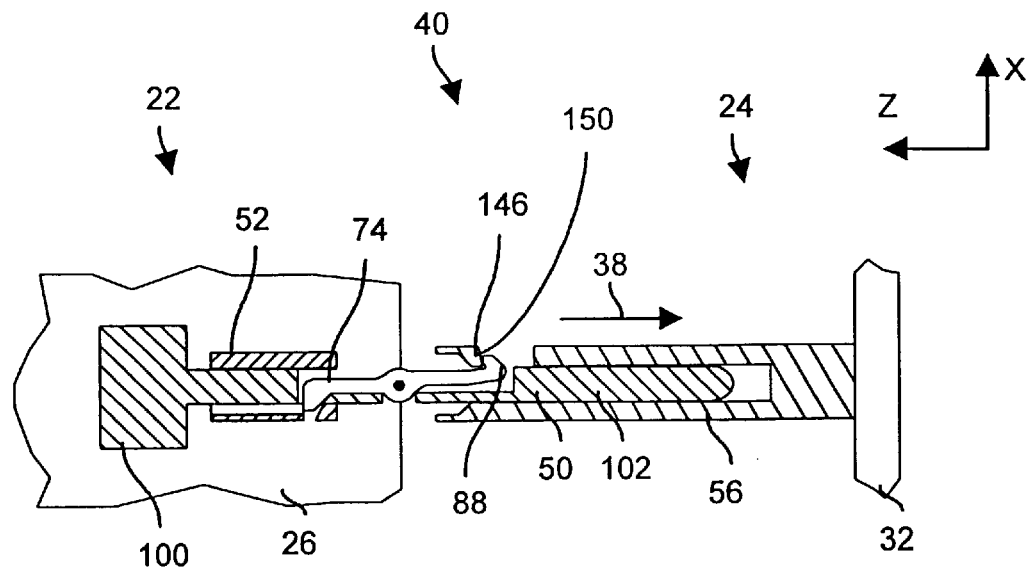
FIG. 11A shows a cross-sectional view of the latching apparatus of FIGS. 2A and 2B through the first dissecting line of FIG. 2A during a latched phase of the latching process.
Figure 11B:
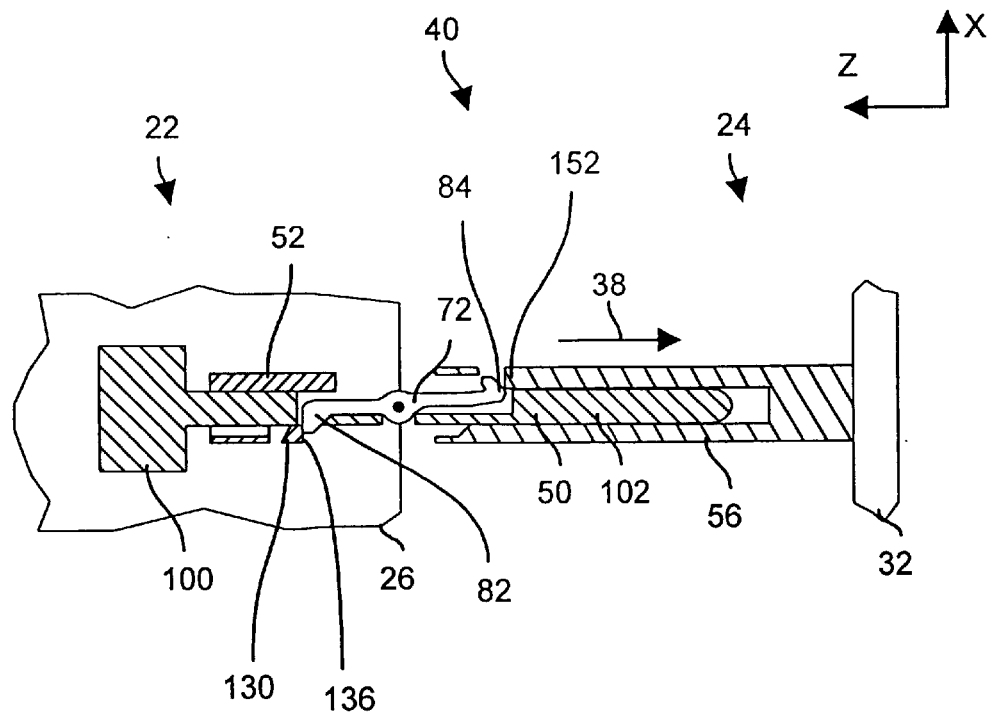
FIG. 11B shows a cross-sectional view of the latching apparatus of FIGS. 2A and 2B through the second dissecting line of FIG. 2A during the latched phase of the latching process.
Figure 12A:
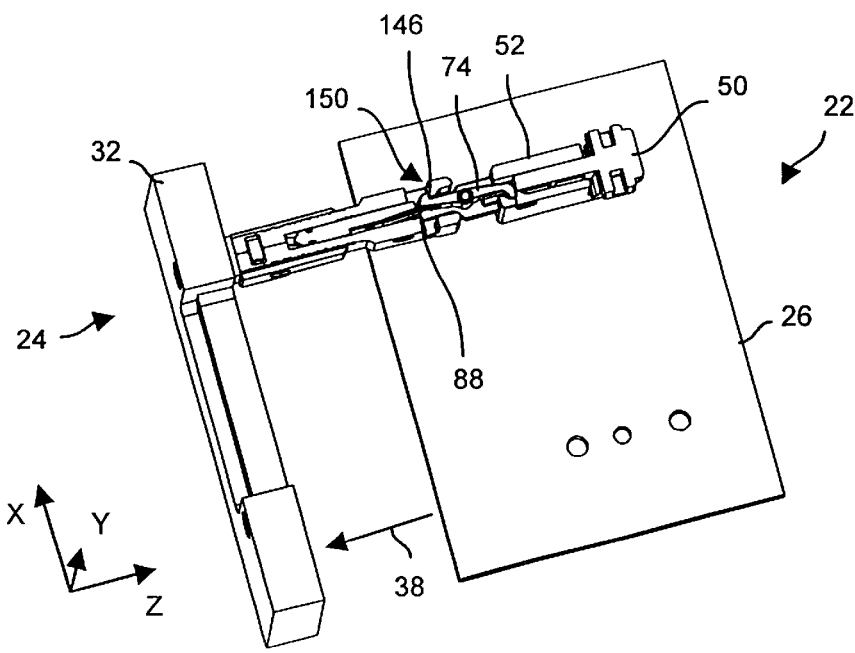
FIG. 12A shows a cutaway view of the latching apparatus of FIGS. 2A and 2B during the latched phase of the latching process.
Figure 12B:
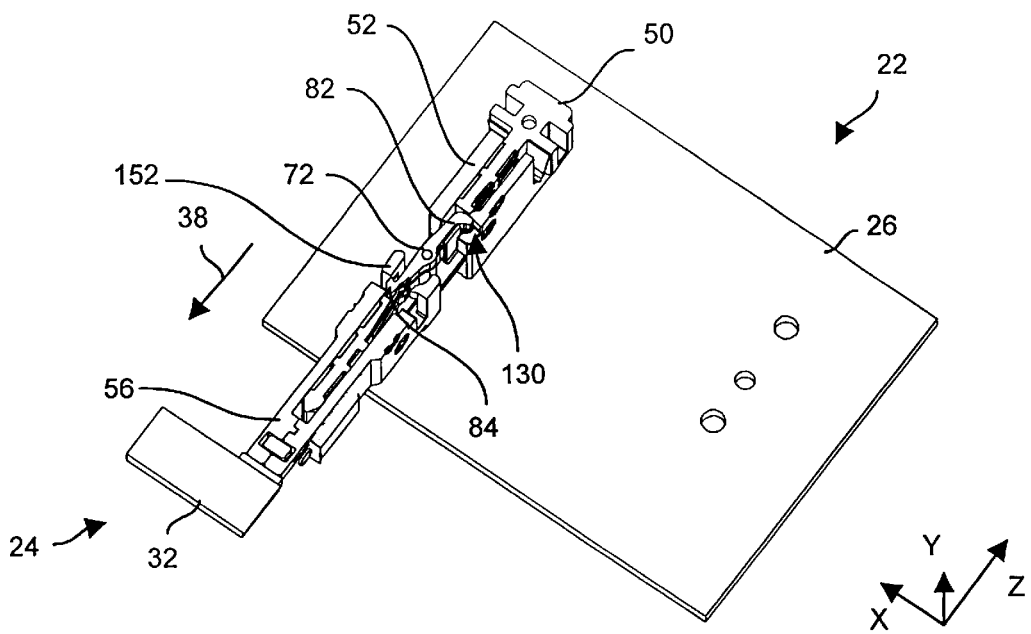
FIG. 12B shows another cutaway view of the latching apparatus of FIGS. 2A and 2B (at a different level) during the latched phase of the latching process.

FIGS. 11A and 11B respectively show cross-sectional views from the bottom angle of the latching apparatus 40 through dissecting lines A—A and B—B of FIG. 2A at another point in time during the latching process. Here, the receptacle locking control arm 74 has moved back in the counterclockwise direction to the first orientation due to biasing from the spring 96 so that the inner face of the tab 88 now prevents the guide member 50 from moving in the direction opposite the arrow 38. FIG. 12A shows a cutaway view (from a top angle) of the receptacle locking control arm 74 at this point, i.e., as the tab 88 just moves past the back 150 of the tab 146 and the receptacle locking control arm 74 moves back to its first orientation. As shown in FIG. 11B, the back 136 of the tab 130 of the circuit board attachment member 52 continues to push the tab 82 of the retaining range control arm 72 and the tab 84 of the retaining range control arm 72 begins to make contact with the tab 152 of the receptacle member 56 (also see FIGS. 6A and 6B). FIG. 12B shows cutaway view (from a top angle) of the receptacle locking control arm 74 at this point.

Figure 13A:
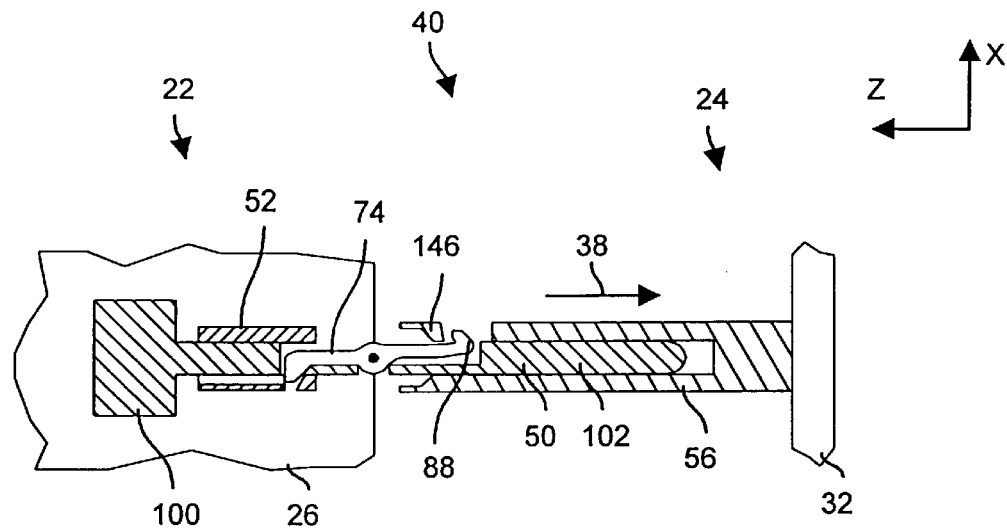
FIG. 13A shows a cross-sectional view of the latching apparatus of FIGS. 2A and 2B through the first dissecting line of FIG. 2A during a release phase of the latching process.
Figure 13B:
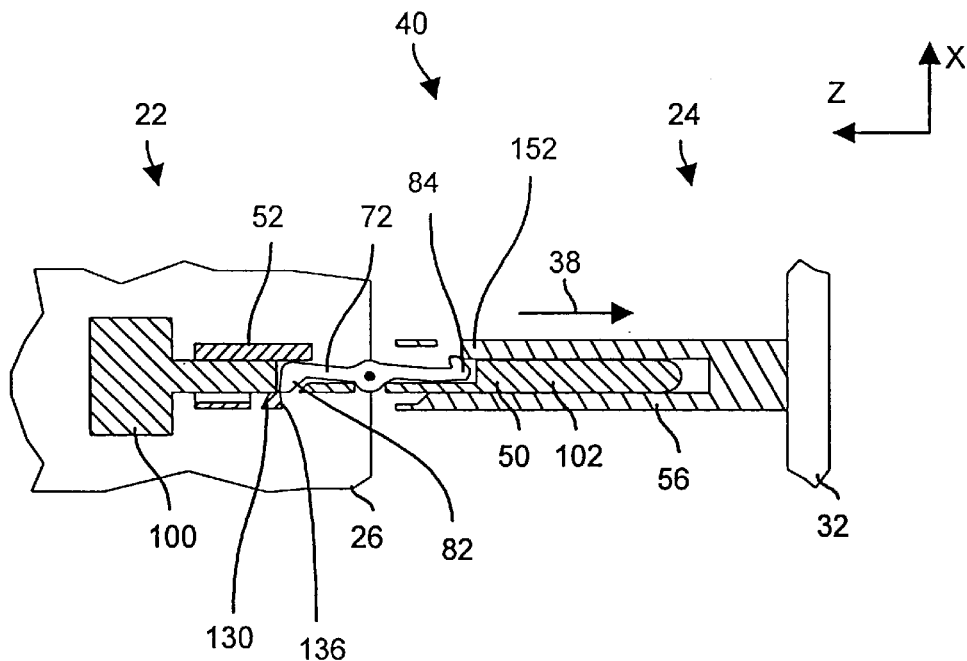
FIG. 13B shows a cross-sectional view of the latching apparatus of FIGS. 2A and 2B through the second dissecting line of FIG. 2A during the release phase of the latching process.

FIGS. 13A and 13B respectively show cross-sectional views from the bottom angle of the latching apparatus 40 through dissecting lines A—A and B—B of FIG. 2A at a further point in time during the latching process. As shown in FIG. 13A, the receptacle locking control arm 74 remains in the first orientation due to biasing from the spring 96 so that the guide member 50 is latched within the receptacle member 56. However, as shown in FIG. 13B, interference from the tab 152 has moved the retaining range control arm 72 in the clockwise direction (from the perspective of FIG. 13B) from an initial biased orientation (FIGS. 7B, 8B, 10B and 11B) to a second orientation allowing the tab 82 of retaining range control arm 72 to clear the tab 130 of the circuit board attachment member 52. Such movement must overcome the biasing forces of the retaining range control spring 94 (FIG. 3) which pushes the arm 72 in the counterclockwise direction back toward the initial orientation.

Figure 14A:
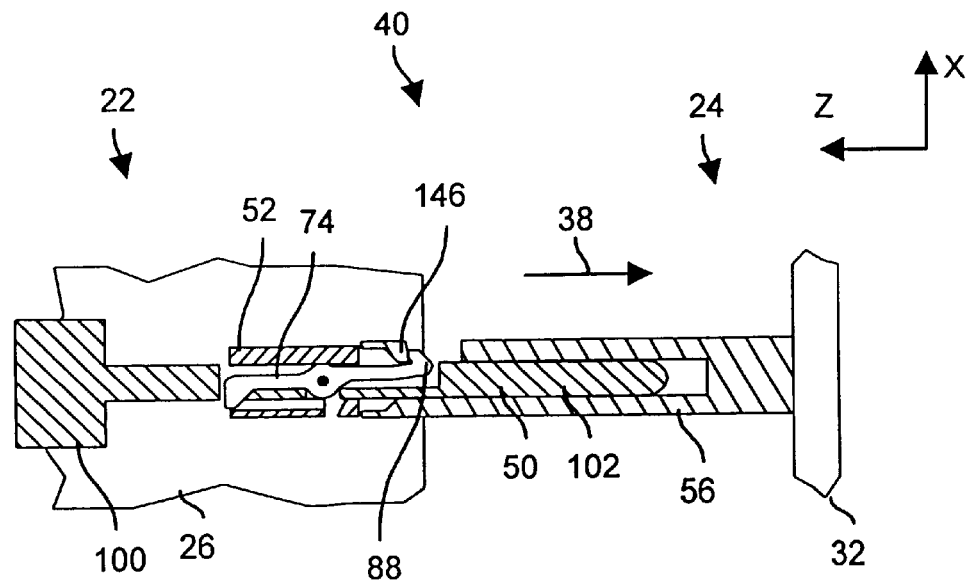
FIG. 14A shows a cross-sectional view of the latching apparatus of FIGS. 2A and 2B through the first dissecting line of FIG. 2A during a released phase of the latching process.
Figure 14B:
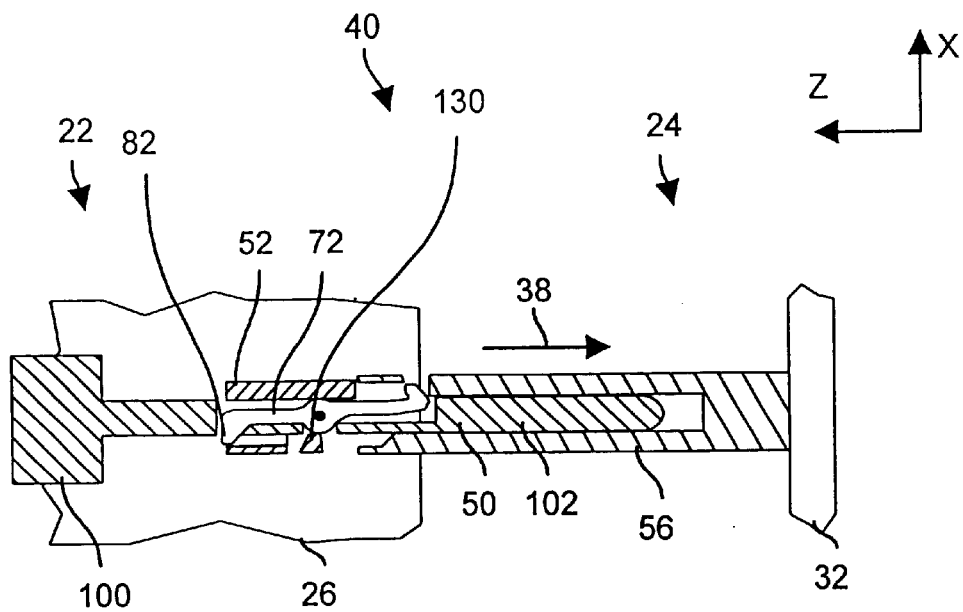
FIG. 14B shows a cross-sectional view of the latching apparatus of FIGS. 2A and 2B through the second dissecting line of FIG. 2A during the released phase of the latching process.

FIGS. 14A and 14B respectively show cross-sectional views from the bottom angle of the latching apparatus 40 through dissecting lines A—A and B—B of FIG. 2A at yet another point in time during the latching process. At this point, the circuit board attachment member 52 is at the end of travel in the float range 64. Latching is compete, i.e. loads are contained, when the tab 82 of the arm 72 has ramped over the tab 130 and the load is carried through the arm 74 at the interface between the tab 88 of the arm 74 and the tab 146 of the receptacle member 56.

As shown in FIG. 14A, the receptacle locking control arm 74 continues to remain in the first orientation due to biasing from the spring 96 so that the guide member 50 remains locked within the receptacle member 56. As shown in FIG.

14B, the tab 82 of the retaining range control arm 72 has cleared the tab 130 of the circuit board attachment member 52. This situation is further illustrated in a top angle view of FIG. 15. As a result, the retaining range control arm 72 has moved back in the counterclockwise direction to the first orientation due to biasing. from the spring 94. Accordingly, the arm 72 of the control assembly 54 no longer holds the circuit board attachment member 52 within the retaining range 64 of the guide member 50 and the circuit board attachment member 52 is now free to travel outside the retaining range 64. Such operation enables substantial movement between the guide member 50 and the circuit board attachment member 52 along the Z-axis. As a result, any Z-directional stresses due to tolerance or component positioning imprecision are not transmitted through the connectors 28, 34 to the circuit boards 26, 32 where they could otherwise result in fatiguing and/or fractures of solder joints, damage to components, etc.

At this point, it should be understood that the guide member 50 is held in a locked manner within the receptacle member 56. Accordingly, any connector pieces attached to the guide member 50 and the receptacle member 56 (e.g., fiber optic connecting elements) can connect in a healthy and robust manner. Contact forces and stresses between these elements and between the guide member 50 and the receptacle member 56 are not transferred to the circuit boards 26, 32 due to the Z-directional float provided by the latching apparatus 40. Rather, the stresses are isolated between the guide member 50, the receptacle member 56 and the associated connecting elements, and not transmitted to the circuit boards 26, 32.

It should be further understood that the above-described latching occurs without direct manipulation of the latching components. Rather, such latching occurs in response to movement of the circuit board 26 relative to the circuit board 32 in a blind mating manner. Such movement is available in card cage assembly applications and other applications in which the user cannot or does not wish to access the latching components directly (e.g., where the user simply pushes the daughter card circuit board 26 toward the backplane circuit board 32).

It should be further understood that the daughter card circuit board 26 is preferably held in a fixed position relative to the backplane circuit board 32. For example, the daughter card circuit board 26 can include levers which engage with a card cage assembly to prevent the daughter card circuit board 26 from inadvertently moving away from the backplane circuit board 36 due to vibration.

Unlocking Operation

Figure 15:
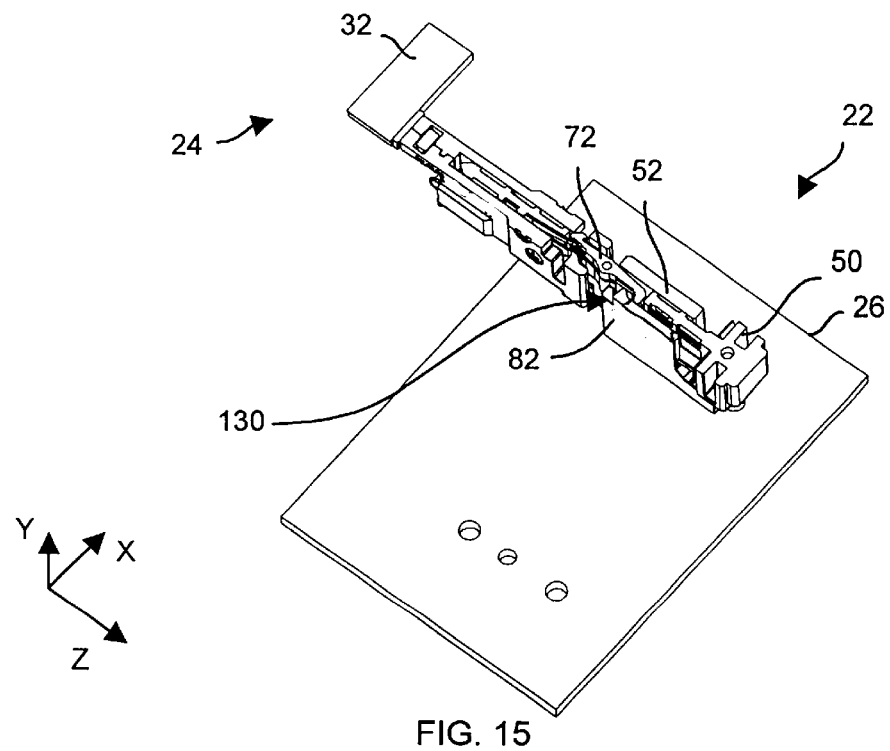
FIG. 15 shows a cutaway view of the latching apparatus of FIGS. 2A and 2B during the released phase of the latching process.

The latching apparatus 40 unlocks when the daughter card 22 moves in the positive Z-direction (i.e., the direction opposite the arrow 38 in FIGS. 14A, 14B and 15. Such de-latching can occur when a user pulls the daughter card 22 out of a card cage assembly and away from the backplane 24 in a blind de-mating manner.

Figure 16:
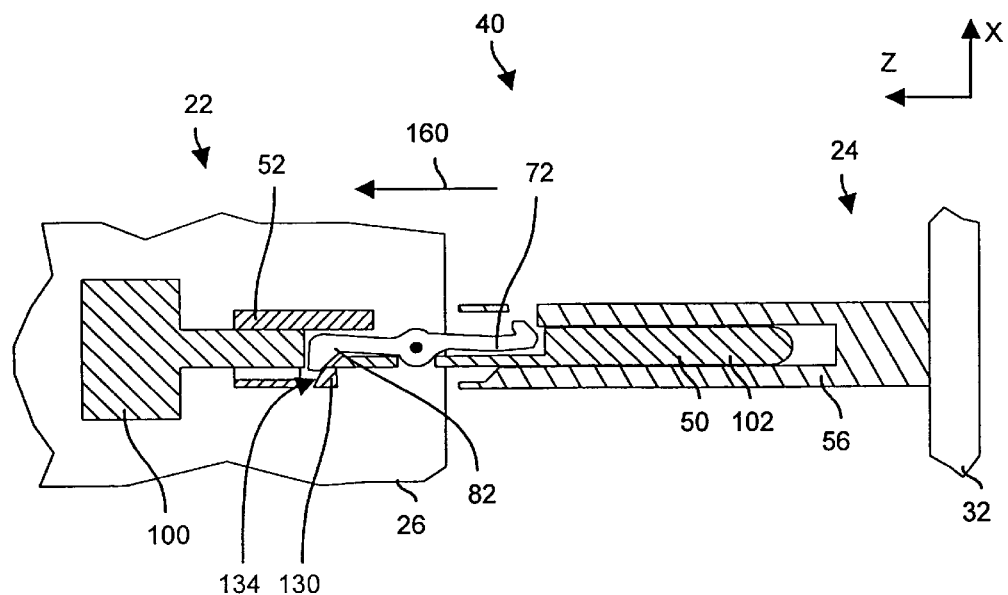
FIG. 16 shows a cross-sectional view of the latching apparatus of FIGS. 2A and 2B through the second dissecting line of FIG. 2A during a de-latching phase of the process.

FIG. 16 shows a cross-sectional view from the bottom angle of the latching apparatus 40 through the dissecting line B—B of FIG. 2A as the daughter card 22 moves in the positive Z-direction, i.e., in the direction of the arrow 160. As the daughter card 22 moves away from the backplane 24, the guide member 50 is held in place relative to the receptacle member 56 due to engagement of the receptacle locking control arm 74 with the tab 146 (see FIG. 14A). Accordingly, the tab 130 of the circuit board attachment member 52 moves in the direction 160 with the daughter card 22 and actuates the retaining range control arm 72 in the clockwise direction. That is, the ramp 134 of the tab 130 (FIG. 5A) actuates the retaining range control arm 72 such that the arm 72 moves from its first orientation to its second orientation (i.e., the clockwise direction as seen in FIG. 16). When the arm 72 moves to the second orientation, the tab 82 of the arm 72 passes the tab 130. At this time, the arm 72 is free again to move back from the second orientation to the first orientation due to biasing from the spring 94 (FIG. 3). Accordingly, the circuit board attachment member 52 is now re-retained within the retaining range 64, i.e., the circuit board attachment member 52 has been reloaded so that it will not allow the guide member 50 to fall out during a subsequent latching operation.

This reloaded situation is also shown in FIG. 11B. As just mentioned, at this point, the circuit board attachment member 52 is again retained in the retaining range 64. That is, the circuit board attachment member 52 cannot exit the retaining range 64 due to interference between the exterior surface of the tab 82 of the arm 72 and the tab 130 of the circuit board attachment member 52. Essentially, the guide member 50 is now reloaded relative to the circuit board attachment member 52 and the daughter card circuit board 22. Accordingly, if the circuit board 22 moves in the negative Z-direction again (e.g., during a second blind mating operation), the guide member 50 will not inadvertently push out of the circuit board attachment member 52.

Figure 17:
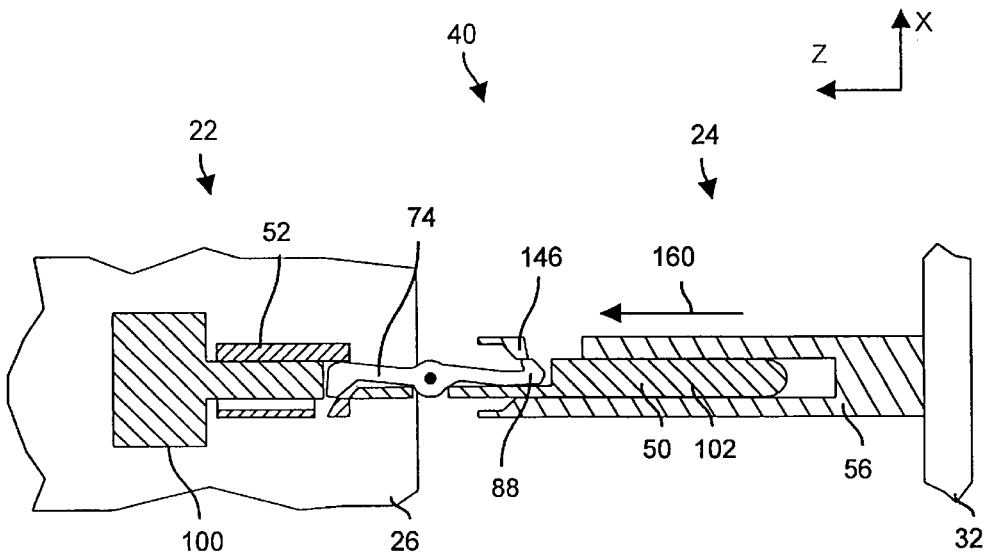
FIG. 17 shows a cross-sectional view of the latching apparatus of FIGS. 2A and 2B through the first dissecting line of FIG. 2A during another portion of the de-latching phase of the process.

FIG. 17 shows a cross-sectional view from the bottom angle of the latching apparatus 40 through the dissecting line A—A of FIG. 2A as the daughter card 22 continues to move in the positive Z-direction 160. As the daughter card 22 continues to move in the positive Z-direction 160, the circuit board attachment member 52 compresses the springs 80 (FIG. 3) and moves very close to the base portion 100 of the guide member 50. In particular, the circuit board attachment member 52 moves from the location 106 to the location 104 within the retaining range 64 (see FIGS. 4A and 4B). At this point, the tab 132 of the circuit board attachment member 52 actuates the receptacle locking control arm 74. In particular, the ramp 138 of the tab 132 (FIG. 5A) moves the arm 74 in the clockwise direction of FIG. 17 so that the arm 74 pivots from its first orientation to its second orientation. To move the arm 74, enough force must be applied to compress both the springs 80 attached to the base portion 100 as well as the spring 96 biasing the arm back toward the first orientation. The inner surface of the tab 88 of the arm 74 clears the tab 146 defined by the receptacle member 56 to unlock the guide member 50 from the receptacle member 56. Accordingly, the guide member 50 is now free to disengage from the receptacle member 56.

Once the arm 74 is moved to the second orientation and the guide member 50 unlatches from the receptacle member 56, the springs 80 and 94 and decompress. Accordingly, the arm 74 moves back to its first orientation due to biasing from the spring 94, and the daughter card circuit board 26 can be moved so that the blade portion 102 of the guide member 50 completely exits the receptacle member 56 (see FIGS. 7A and 7B).

It should be understood that the above-described unlatching occurred without direct manipulation of the latching components. Rather, such unlatching occurred in response to movement of the circuit board 26 relative to the circuit board 32 in a blind un-mating manner similar to the blind mating process explained earlier. Such movement is available in card cage assembly applications and other applications in which the user cannot or does not wish to access the latching components directly. To this end, the user simply pulls the daughter card circuit board 26 from the backplane circuit board 32 with enough force to overcome the springs 80 and 94 which de-latches the receptacle locking control arm 74 from the receptacle member 56.

At this point, the daughter card 22 is completely disconnected from the backplane 24. Additionally, the latching apparatus 40 is reloaded (i.e., the guide member 50 is securely retained in the retaining range 64 and is ready for a subsequent latching operation. The daughter card 22 and the backplane 24 can connect and disconnect again and again as described above. Moreover, such connecting and disconnecting can occur in a blind mating and blind un-mating manner simply by moving the daughter card 22 and the backplane 24 relative to each other without directly manipulating the latching apparatus 40.

Connector Implementation

As mentioned earlier, the latching apparatus 40 is well-suited as a latching mechanism for connectors. In particular, the latching apparatus 40 can be tailored to fit one of any modularized locations in a connector that holds multiple connecting elements together. Such modularization enables easy scalability with little or no retooling and/or redesigning.

Figure 18:
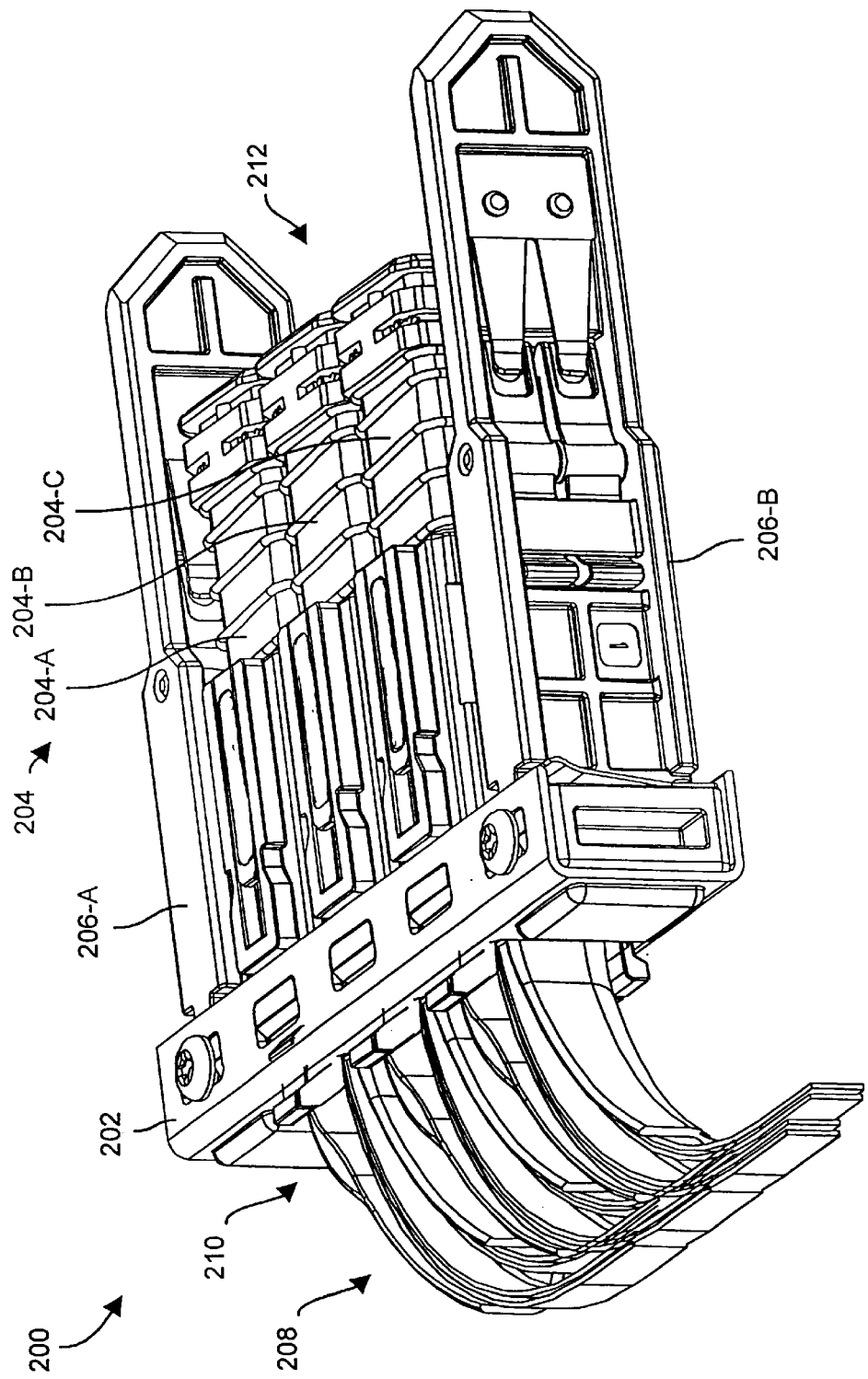
FIG. 18 shows a perspective view of a connector which utilizes the latching apparatus of FIGS. 2A and 2B.

FIG. 18 shows a fiber optic connector 200 which utilizes the latching apparatus 40. The fiber optic connector 200 includes a support 202, a set of spring-loaded fiber optic connecting elements 204-A, 204-B, 204-C (collectively, connecting elements 204), and a set of latching elements 206-A, 206-B (collectively, latching elements 206). Fiber optic cables 208 of the connecting elements 204 extend from ends 210 of the connecting elements 204 which are opposite fiber optic interface ends 212 of the connecting elements 204.

By way of example only, the connector 200 includes three fiber optic connecting elements 204 which are arranged in a row, i.e., in a side-by-side manner. Also by way of example only, the latching elements 204 are disposed on each end of the row of connecting elements 204. Other arrangements include a different number of connecting elements 204. Furthermore, other arrangements include at least one latching element 206 which is not at an end of a row connecting elements 204. For example, any of the connecting elements 204 can be replaced with a latching element 206. Additionally, the support 202 can be extended (or shortened) to hold a different number of connecting elements 204 and/or a different number of latching elements 206.

The use of multiple latching elements 206 enable forces to be distributed among the latching elements 206. Accordingly, less force is placed on any particular latching element 206.

In one arrangement, the support 202 includes a substantially rigid material such as metal or plastic, and is made available different lengths to accommodate different numbers of elements (e.g., five, six, seven, etc.). For instance, the support 202 be made from a U-shaped length of steel which is simply cut to a particular length. Accordingly, different combinations of elements 204, 206 can be put together for different custom applications without retooling and redesigning a multitude of housings as is done in the conventional floating housing approach. Thus, there is significant cost savings available to the manufacturer.

The connector 200 is suitable for use as the connector 28 of the daughter card 22 (also see FIGS. 1A and 1B). The connector 200 is configured to connect with a corresponding connector having corresponding receptacle members (see the receptacle member 56 of FIGS. 6A and 6B) to receive the latching elements 206. In particular, when the connector 200 moves toward the corresponding connector (e.g., when the daughter card 22 moves toward the backplane 24), the latching elements 206 lock with the receptacle members to hold the fiber optic connecting elements 204 against corresponding fiber optic connecting elements of the corresponding connector to form a set of healthy and robust fiber optic connections. Such locking can occur in a blind mating operation where the latching elements 206 of the connector 200 are retained in retaining ranges 64 of circuit board attachment members 52 of the circuit board. During latching, the circuit board attachment members 52 are freed from the retaining ranges 64 to provide substantial freedom of movement in the Z-direction to minimize or completely avoid transfer of connector stresses to circuit boards.

It should be understood that the modularity of the connecting elements 204 and the latching elements 206 enables easy removal and repair of a particular element 204, 206. That is, if there is damage to a particular element 204, 206, only that element 204, 206 need be removed and replaced rather than the entire connector 200.

Furthermore, if a manufacturer develops a new design for an element 204, 206 (i.e., a new connecting element 204, a new latching element 206 or yet another element, etc.), the manufacturer can easily integrate that new design by including it in one or more module locations within the connector 200. The manufacturer does not need to significantly retool the entire connector (e.g., redesign the entire connector housing, etc.).

Figure 19:
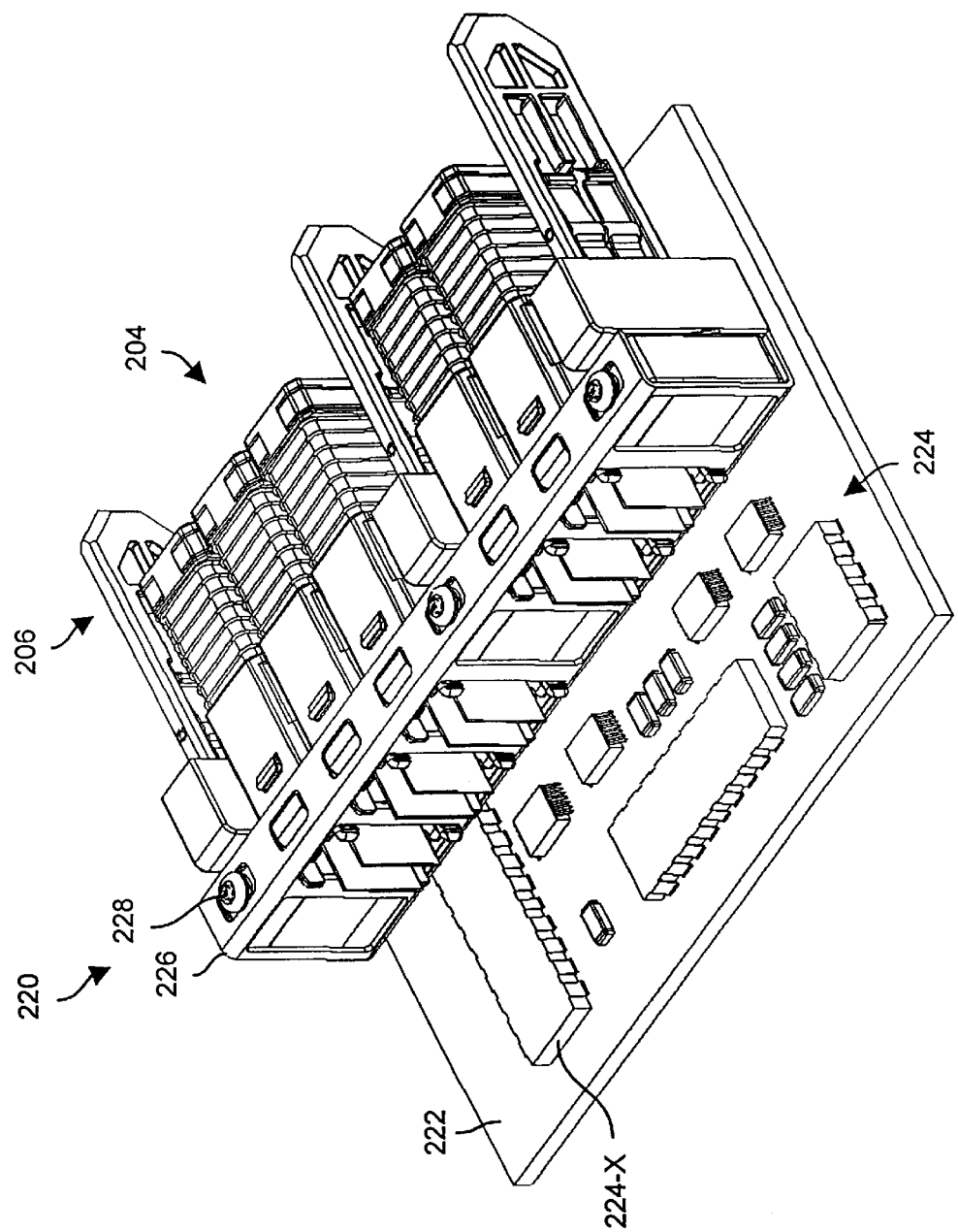
FIG. 19 shows a perspective view of a connector similar to that shown in FIG. 18 which is mounted over a set of circuit board components on a circuit board.

FIG. 19 shows a connector 220 similar to the connector 200 of FIG. 18 installed on a circuit board 222 (e.g., the daughter card circuit board 22 of FIGS. 1A and 1B). Circuit board components 224 are mounted on the circuit board 222 as well. By way of example only, the connector 220 includes a support 226 for carrying seven modularized elements 204, 206, and hardware 228 for securing the latching elements 206 in place. In particular, the connector 220 includes five connecting elements 204 which are interleaved between three latching elements 206. The multiple latching elements 206 facilitate distribution of forces so that no particular latching element 206 bears the entire amount of force.

By way of example only, the circuit board attachment members 52 have slide portions 110 (also see FIGS. 5A and 5B) having a thickness which raise the height of the support 226 and the connecting elements 204, 206 to allow one or more circuit board components 224 to reside between the surface of the circuit board 222 and the. connecting elements 204, 206. That is, the circuit board attachment members 52 provide clearance between the connecting elements 204, 206 (e.g., the guide members 50) and circuit board components 224 mounted on the circuit board 222 when the circuit board attachment members 52 attach to the circuit board 222. For instance, FIG. 19 shows a circuit board component 224-X disposed between the circuit board 222 and the support 226. Such arrangements reduce the amount of surface area of the circuit board 222 required by the connector 220 thus freeing board space for other components. Further details of the invention will now be provided with reference to FIG. 20.

Figure 20:
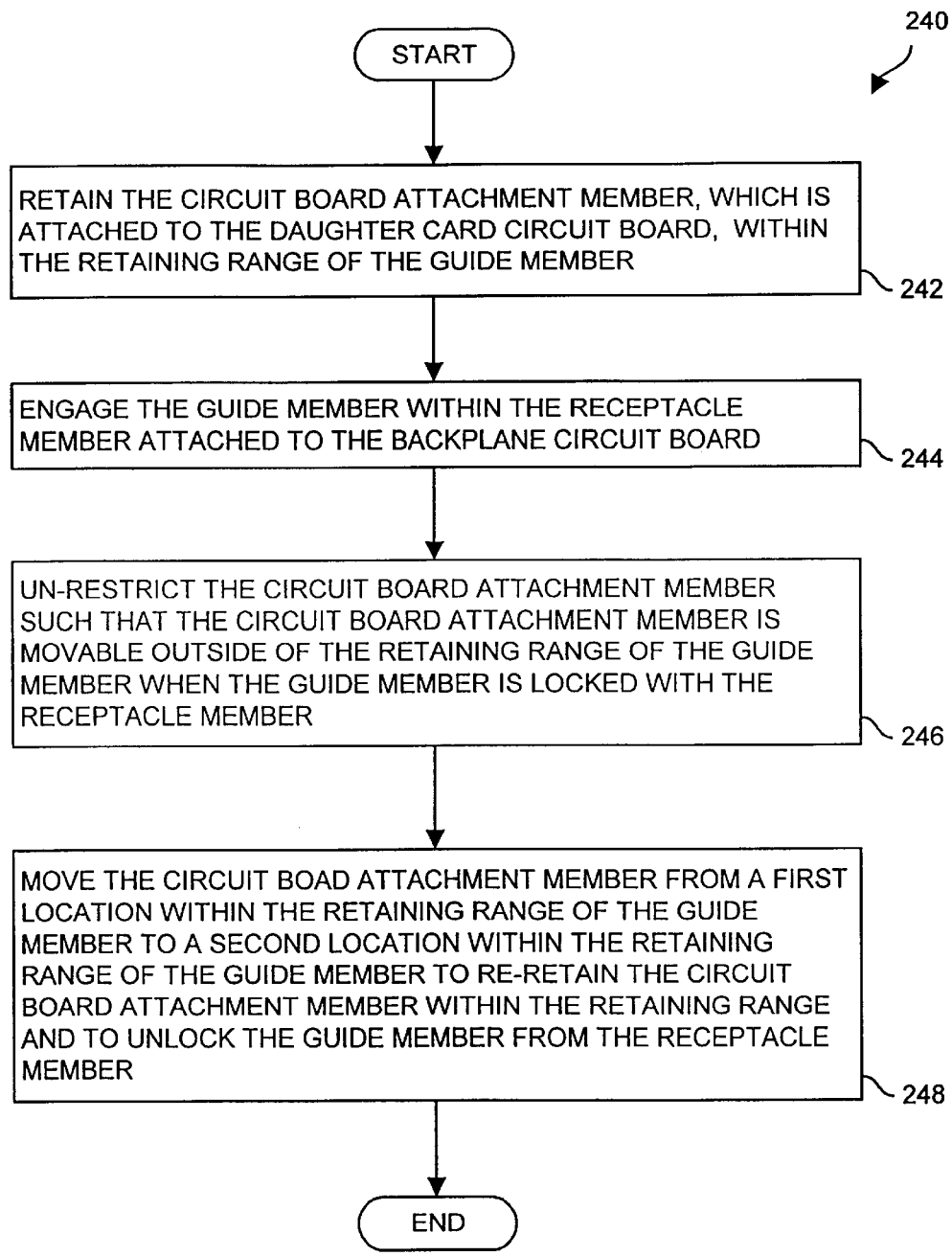
FIG. 20 is a flowchart of a procedure performed by a user of the latching apparatus of FIGS. 2A and 2B.

FIG. 20 shows a procedure 240 performed by a user of the latching apparatus 40 when operating the latching apparatus 40. To supplement this explanation, the operation of the latching apparatus 40 will be further described with reference to the connector 200 of FIG. 18, and the daughter card 22 and the backplane 24 of FIGS. 1A and 1B.

In step 242, the user retains the circuit board attachment member 52 within the retaining range 64 of the guide member 50. In the context of the connector 200 of FIG. 18, and the daughter card 22 and the backplane 24 of FIGS. 1A and 1B, the user takes the connector 200 of FIG. 18 and installs the connector 200 on the daughter card circuit board 26 by inserting the guide members 50 of the latching elements 206 through circuit board attachment members 52 secured to the daughter card circuit board 26.

In step 244, the user engages the guide member 50 within the receptacle member attached to the backplane circuit board 32. In the context of the connector 200 of FIG. 18, and the daughter card 22 and the backplane 24 of FIGS. 1A and 1B, the user moves the daughter card 22 toward the backplane 24 such that the guide members 50 of the latching elements 206 engage with corresponding receptacle members 56 on a corresponding backplane connector.

In step 246, the user un-restricts the circuit board attachment member 52 such that the circuit board attachment member 52 is movable outside of the retaining range 64 of the guide member 50 when the guide member 50 is locked with the receptacle member 56. In the context of the connector 200 of FIG. 18, and the daughter card 22 and the backplane 24 of FIGS. 1A and 1B, the user further moves the daughter card 22 toward the backplane 24 until the guide members 50 of the connector 200 latch to respective receptacle members 56 of a corresponding backplane connector. At this point, the circuit board attachment members 52 are no longer retaining within the retaining ranges 64 of the guide members 50. Accordingly, the connector 200 has substantial freedom of movement in the Z-direction to avoid passing on connector stresses (e.g., stresses due to poor tolerances) to the daughter card 22 and the backplane 24 (e.g., to solder joints of electrical components). Such connection can be made in response to blind mating operation (i.e., simply moving the daughter card 22 and the backplane 24 together such as by pushing the daughter card 22 toward the backplane 24 in a card cage assembly).

In step 248, the user can disconnect the daughter card 22 from the backplane 24 by moving the circuit board attachment member 52 back into the retaining range 64, and then from the location 106 to the location 104 within the retaining range 64 thus re-retaining the circuit board attachment member 52 within the guide member 50 and unlocking the guide member 50 from the receptacle member 56. In the context of the connector 200 of FIG. 18, and the daughter card 22 and the backplane 24 of FIGS. 1A and 1B, the user simply pulls the daughter card 22 away from the backplane 24. The control assemblies 54 actuate to re-retain the circuit board attachment members 52 within the latching elements 206, and to unlock the guide members 50 from the receptacle members 56 of the corresponding backplane connector. Again, such de-latching can occur in response to a blind de-mating operation by simply pulling the daughter card 22 away from the backplane 24.

It should be understood that the fiber optic connectors 28, 34 and the electrical connectors 30, 36 can be configured to connect in a staggered manner such that they work together in harmony rather than compete against each other. One should appreciate that, unlike the electrical connectors 30, 36, the fiber optic connectors 28, 34 function as butt-coupled devices. That is, the end faces must remain in physical contact at all times to insure that the optical signal is stable and uninterrupted. Fortunately, this does not complicate matters since the optical mating sequence can be established prior to the electrical.

Without such staggered mating, it is possible that conflicts could arise between the fiber optic connectors 28, 34 and the electrical connectors 30, 36. There are a few reasons for this.

First, extreme mating forces in excess of 150 lbs., can be generated when joining high-density electrical connectors. Manual cam latch mechanisms are therefore typically used to join the individual daughter cards to the backplane. These devices although manually operated do not provide a great deal of user feedback other than a go, no-go, type situation. With this being the case, if any given connector is not properly aligned under such loads, then the likelihood of destruction is great. Therefore, the individual connectors should be aligned before the latches are engaged. Furthermore, due to the difference in butt-coupling (for fiber optic connectors) vs. wipe (for electrical connectors), staggering the mating sequence from optical to electrical results in isolation of the mating force spikes causes by electrical connection formation. Additionally, this provides smoother cam latch activation when attempting to seat the daughter card 22 against the backplane 24 within a card cage assembly. Also, this removes any additional loads that could bring the latches beyond their elastic limit.

Second, in order to accommodate a vast array of electrical connectors and to provide a product that is easily leveraged into new technologies, the freedom of movement along the Z-axis enables compatibility and limits the possibility of conjoined future force spikes. In order to provide such functionality (i.e., reasonably large Z-directional travel) freedom of movement within a relatively large range (e.g., 3 to 7 mm) is preferable. To achieve this float, a slideable mechanism (i.e., the guide member 50 slidably engaged within the circuit board attachment member 52) is employed.

Furthermore, the staggered mating sequence can occur transparently to the user. That is, the latching, when sequenced correctly, can provide a blind-mate coupling between the daughter card 22 and the backplane 24. The user can be made unaware of the latching or disengagement process. Once mated, any forces generated against the backplane 24 are then relaxed by means of the floating (slideable) members (i.e., the guide members 50 sliding within the circuit board attachment members 52 outside their retaining range 64. This prevents the potential for cracking traces or deforming the backplane over time and temperature.

As described above, the invention is directed to techniques for connecting elements together (e.g., fiber optic interface elements) using an improved latching apparatus 40. The latching apparatus 40 employs a control assembly 54 (e.g., an assemblage of control arms 72, 74) which operates to connect the elements in a manner that permits substantial connector movement in the Z-direction, as well as enables easy scalability and customization with minimal or no retooling. With substantial Z-directional movement available, there is little or no Z-directional board stress transmitted from connectors to other locations (e.g., to electrical connectors having fragile solder joints). Furthermore, such easy scalability enables a manufacturer to offer a variety of connector configurations without incurring significant retooling and redesigning costs.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the latching apparatus 40 was described above as being suitable for connecting fiber optic connecting elements 204 by way of example. The latching apparatus 40 is also suitable for connecting other types of connecting elements as well such as electrical connecting elements (e.g., elements with electrical contacts, pads, feet, pins, etc). In some arrangements, the latching apparatus 40 provides mechanical latching for multiple devices (e.g., circuit board to circuit board, circuit board component to circuit board component, etc.). The latching apparatus 40 is useful in applications which involve connecting multiple parts together, and can be scaled larger or smaller than that described above for forming fiber optic connections.

Additionally, it should be understood that the latching apparatus 40 was described above as being well-suited for latching a daughter card circuit board 26 moving along the Z-axis relative to a backplane circuit board 32 by way of example only. The latching apparatus 40 is suitable for latching in other orientations as well such as in latching together two circuit boards disposed in a parallel manner where the Z-direction is substantially perpendicular to the planes of the circuit boards.

Furthermore, it should be understood that the guide members 50 are not necessarily drawn to scale. For example, in some arrangements, the guide members 50 are taller, and well-suited for connectors having taller connecting elements 204 (e.g., connecting elements having multiple ferrules or tall ferrules for higher density applications).

Additionally, it should be understood that the latching apparatus 40 was described above as latching circuit boards together by way of example only. The latching apparatus 40 is well-suited for latching other devices as well such as a variety of devices having the form of a moving panel, a flat plate, and the like. As such, the various components described above can be broadly construed in their operation. For example, the above-described circuit board attachment member 52 when fastened to a general flat panel or plate (rather than a circuit board) is essentially a panel attachment member, and so on.

Furthermore, it should be understood that, in some arrangements, the receptacle member 56 is modularized on the backplane side thus enabling corresponding backplane connectors (e.g., see the backplane connector 34) to include modular connecting and latching elements as well.

What is claimed is:

1. A latching apparatus, comprising:
   a guide member;
   a circuit board attachment member which is configured to attach to a circuit board; and
   a control assembly which is configured to:
     retain the circuit board attachment member within a retaining range of the guide member when the guide member is unlocked from a receptacle member, and
     un-restrict the circuit board attachment member such that the circuit board attachment member is movable outside of the retaining range of the guide member when the guide member is locked with the receptacle member.

2. The latching apparatus of claim 1 wherein the control assembly includes:
   a retaining range control arm which is pivotally coupled to the guide member, wherein the retaining range control arm is configured to:
     (i) retain the circuit board attachment member within the retaining range of the guide member when the retaining range control arm is in a first pivoted retaining range control arm orientation relative to the guide member, and
     (ii) un-restrict the circuit board attachment member such that the circuit board attachment member is movable outside of the retaining range of the guide member when the retaining range control arm is in a second pivoted retaining range control arm orientation that is different than the first pivoted retaining range control arm orientation.

3. The latching apparatus of claim 2 wherein the control assembly further includes:
   a receptacle locking control arm which is pivotally coupled to the guide member, wherein the receptacle locking control arm is configured to:
     (i) lock the guide member with the receptacle member when the receptacle locking control arm is in a first pivoted receptacle locking control arm orientation relative to the guide member, and
     (ii) unlock the guide member from the receptacle member when the receptacle locking control arm is in a second pivoted receptacle locking control arm orientation that is different than the first pivoted receptacle locking control arm orientation.

4. The latching apparatus of claim 3 wherein the control assembly further includes a common pivot member coupled to the guide member, and wherein each of the retaining range control arm and the receptacle locking control arm is configured to pivot about the common pivot member.

5. The latching apparatus of claim 3 wherein the control assembly further includes:
   a retaining range control arm spring, coupled to the guide member, which is configured to bias the retaining range control arm in the first pivoted retaining range control arm orientation relative to the guide member; and
   a receptacle locking control arm spring, coupled to the guide member, which is configured to bias the receptacle locking control arm in the first pivoted receptacle locking control arm orientation relative to the guide member.

6. The latching apparatus of claim 1 wherein the control assembly includes:
   a receptacle locking control arm which is pivotally coupled to the guide member, wherein the receptacle locking control arm is configured to:
     (i) lock the guide member with the receptacle member when the receptacle locking control arm is in a first pivoted receptacle locking control arm orientation relative to the guide member, and
     (ii) unlock the guide member from the receptacle member when the receptacle locking control arm is in a second pivoted receptacle locking control arm orientation that is different than the first pivoted receptacle locking control arm orientation.

7. The latching apparatus of claim 6 wherein the circuit board attachment member is configured to move the receptacle locking control arm from the first pivoted receptacle locking control arm orientation toward the second pivoted receptacle locking control arm orientation to unlock the guide member from the receptacle member when the circuit board attachment member moves from a first location within the retaining range of the guide member toward a second location within the retaining range of the guide member.

8. The latching apparatus of claim 7, further comprising:
   a spring coupled to the guide member to bias the circuit board attachment member from the second location within the retaining range of the guide member toward the first location within the retaining range of the guide member.

9. The latching apparatus of claim 1 wherein the circuit board attachment member includes:
   a slide portion which couples the circuit board attachment member to the guide member in a slideable manner.

10. The latching apparatus of claim 9 wherein the circuit board attachment member further includes:
    a set of protrusions which is integral with the slide portion, wherein the set of protrusions is configured to restrict movement of the circuit board attachment member relative to the circuit board when the circuit board attachment member attaches to the circuit board.

11. The latching apparatus of claim 9 wherein the guide member is configured to lock and unlock with the receptacle member along a Z-direction axis, and wherein the slide portion of the circuit board attachment member couples to the guide member such that the circuit board attachment member is slideable relative to the guide member along the Z-direction axis while substantially preventing movement of the circuit board attachment member relative to the guide member along an X-direction axis and a Y-direction axis.

12. The latching apparatus of claim 9 wherein the slide portion of the circuit board attachment member is configured to provide a clearance between the guide member and a circuit board component mounted on the circuit board when the circuit board attachment member attaches to the circuit board.

13. The latching apparatus of claim 1 wherein the guide member includes:
 a base portion which is configured to modularly fit into any of multiple module positions of a holder of a connecting device; and
 a blade-shaped portion which is integral with the base portion, wherein the blade-shaped portion is configured to slide into a blade-shaped aperture defined by the receptacle member.

14. A connector, comprising:
 a connecting element;
 a support; and
 a latching apparatus coupled by the support to the connecting element, the latching apparatus including:
  a guide member;
  a circuit board attachment member which is configured to attach to a circuit board; and
  a control assembly which is configured to:
   retain the circuit board attachment member within a retaining range of the guide member when the guide member is unlocked from a receptacle member, and
   un-restrict the circuit board attachment member such that the circuit board attachment member is movable outside of the retaining range of the guide member when the guide member is locked with the receptacle member.

15. The connector of claim 14 wherein the connecting element is a fiber optic connecting body having a fiber optic interface.

16. A circuit board module, comprising:
 a circuit board;
 a set of circuit board components mounted to the circuit board; and
 a connector having (i) a connecting element in communication with the set of circuit board components, (ii) a support, and (iii) a latching apparatus coupled by the support to the connecting element, the latching apparatus including:
  a guide member;
  a circuit board attachment member attached to the circuit board; and
  a control assembly which is configured to:
   retain the circuit board attachment member within a retaining range of the guide member when the guide member is unlocked from a receptacle member, and
   un-restrict the circuit board attachment member such that the circuit board attachment member is movable outside of the retaining range of the guide member when the guide member is locked with the receptacle member.

17. The connector of claim 16 wherein the set of circuit board components includes a fiber optic component, and wherein the connecting element of the connector is a fiber optic connecting body having a fiber optic interface which is in communication with the fiber optic component.

18. A circuit board module, comprising:
 a first receptacle for receiving a guide member, the first receptacle being adapted to receive a floatable mounting mechanism for attachment to a first planar device;
 a second receptacle for supporting a slideable guide member, the receptacle being adapted for a fixed mounting mechanism for attachment to a second planar device;
 a guide member slideably coupled to and within the second receptacle for attachment to the first receptacle;
 a first retention mechanism provided between the second receptacle and the guide member, to engage the guide member with the second receptacle when the guide member is not coupled to the first receptacle;
 a second retention mechanism provided between the first receptacle and the guide member, to engage the guide member with the first receptacle while the second receptacle is still coupled to the guide member;
 a first separation mechanism provided between the first receptacle and the guide member to separate the first retention mechanism from the second receptacle when the guide member is retained to the first receptacle by means of the second retention mechanism; and
 a second separation mechanism provided between the second receptacle and the guide member, to separate the second retention mechanism when the second receptacle has been re-coupled to the guide member and the first receptacle is being decoupled from the guide member.

19. A connection system, comprising:
 a first connector having a first connecting element and a receptacle member;
 a second connector having (i) a second connecting element, (ii) a support, and (iii) a latching apparatus coupled by the support to the second connecting element, the latching apparatus including:
  a guide member;
  a circuit board attachment member which is configured to attach to a circuit board; and
  a control assembly which is configured to:
   retain the circuit board attachment member within a retaining range of the guide member when the guide member is unlocked from the receptacle member of the first connector, and
   un-restrict the circuit board attachment member such that the circuit board attachment member is movable outside of the retaining range of the guide member when the guide member is locked with the receptacle member of the first connector such that the first and second connecting elements are connected together.

20. A method for connecting a first circuit board module to a second circuit board module using a latching apparatus having (i) a guide member and (ii) a circuit board attachment member attached to a circuit board of the first circuit board module, the method comprising the steps of:

retaining the circuit board attachment member within a retaining range of the guide member;

engaging the guide member within a receptacle member attached to a circuit board of the second circuit board module; and un-restricting the circuit board attachment member such that the circuit board attachment member is movable outside of the retaining range of the guide member when the guide member is locked with the receptacle member.

21. The method of claim 20, further comprising the step of:

moving the circuit board attachment member from a first location within the retaining range of the guide member to a second location within the retaining range of the guide member to re-retain the circuit board attachment member within the retaining range of the guide member and to unlock the guide member from the receptacle member.

* * * * *